US012786986B2

(12) United States Patent
Babaei

(10) Patent No.: US 12,786,986 B2
(45) Date of Patent: Nov. 3, 2026

(54) ENHANCED CROSS-CARRIER PROCESSES

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

(*) Notice: Subject to any disclaimer, the term of this patent is extended or adjusted under 35 U.S.C. 154(b) by 794 days.

(21) Appl. No.: 17/889,890

(22) Filed: Aug. 17, 2022

(65) Prior Publication Data

US 2023/0073219 A1 Mar. 9, 2023

Related U.S. Application Data

(60) Provisional application No. 63/234,550, filed on Aug. 18, 2021.

(51) Int. Cl.

*H04W 72/1263* (2023.01)
*H04L 1/1812* (2023.01)
*H04W 72/23* (2023.01)

(52) U.S. Cl.

CPC ....... *H04W 72/1263* (2013.01); *H04L 1/1816* (2013.01); *H04W 72/23* (2023.01)

(58) Field of Classification Search

CPC .............. H04W 72/1263; H04W 72/23; H04L 1/1816; H04L 1/1819; H04L 1/1822; H04L 1/189

See application file for complete search history.

(56) References Cited

U.S. PATENT DOCUMENTS

| | | | | |
|---|---|---|---|---|
| 2015/0146692 A1* | 5/2015 | Yi | H04W 36/249 370/331 |
| 2015/0365931 A1* | 12/2015 | Ng | H04L 1/1887 370/329 |
| 2018/0048431 A1* | 2/2018 | Wang | H04L 1/08 |
| 2020/0412487 A1* | 12/2020 | Zhou | H04L 5/0044 |
| 2022/0086853 A1* | 3/2022 | Xiao | H04L 1/1893 |
| 2023/0026760 A1* | 1/2023 | Takeda | H04L 1/1812 |
| 2023/0074086 A1* | 3/2023 | Yi | H04L 1/1822 |
| 2023/0199797 A1* | 6/2023 | Yi | H04W 72/232 370/329 |
| 2023/0209627 A1* | 6/2023 | Wu | H04L 1/189 370/329 |
| 2023/0284218 A1* | 9/2023 | Chou | H04W 72/0446 370/329 |
| 2024/0057108 A1* | 2/2024 | Yi | H04L 1/1854 |

OTHER PUBLICATIONS

3GPP TS 38.211 V16.6.0 (Jun. 2021); Technical Specification; 3rd Generation Partnership Project; Technical Specification Group Radio Access Network; NR; Physical channels and modulation; (Release 16).

(Continued)

*Primary Examiner* — Christine Ng
(74) *Attorney, Agent, or Firm* — Alireza Babaei

(57) ABSTRACT

A wireless device may receive a DCI indicating retransmission of a first TB via a second cell. An initial transmission of the first TB may be via a first cell. The wireless device may transmit or receive the retransmission of the first TB via the second cell based on the DCI.

20 Claims, 24 Drawing Sheets

(56) References Cited

OTHER PUBLICATIONS

3GPP TS 38.212 V16.6.0 (Jun. 2021); Technical Specification; 3rd Generation Partnership Project; Technical Specification Group Radio Access Network; NR; Multiplexing and channel coding; (Release 16).
3GPP TS 38.213 V16.6.0 (Jun. 2021); Technical Specification; 3rd Generation Partnership Project; Technical Specification Group Radio Access Network; NR; Physical layer procedures for control; (Release 16).
3GPP TS 38.214 V16.6.0 (Jun. 2021); Technical Specification; 3rd Generation Partnership Project; Technical Specification Group Radio Access Network; NR; Physical layer procedures for data; (Release 16).
3GPP TS 38.300 V16.6.0 (Jun. 2021); Technical Specification; 3rd Generation Partnership Project; Technical Specification Group Radio Access Network; NR; NR and NG-RAN Overall Description; Stage 2; (Release 16).
3GPP TS 38.321 V16.5.0 (Jun. 2021); Technical Specification; 3rd Generation Partnership Project; Technical Specification Group Radio Access Network; NR; Medium Access Control (MAC) protocol specification; (Release 16).
3GPP TS 38.331 V16.5.0 (Jun. 2021); Technical Specification; 3rd Generation Partnership Project; Technical Specification Group Radio Access Network; NR; Radio Resource Control (RRC); Protocol specification; (Release 16).
RAN Rel 18 Workshop; Further Enhanced IIoT /URLLC (FeIIoT); Jun. 28-Jul. 2, 2021; RWS-210071; Nokia, Nokia Shanghai Bell.
3GPP TSG RAN Rel-18 Workshop; Jun. 28-Jul. 2, 2021; RWS-210108; [non-eMBB] URLLC Enhancements; MediaTek Inc.
3GPP TSG RAN Rel 18 workshop; RWS-210167; Electronic Meeting, Jun. 28-Jul. 2, 2021; Further URLLC/IIOT enhancements in Rel 18; Source: vivo; Document for: Discussion & Decision; Agenda Item: 4.2.
3GPP TSG RAN Rel-18 workshop; RWS-210380; Electronic Meeting, Jun. 28-Jul. 2, 2021; On Rel-18 URLLC and IIOT enhancements; Agenda item: 4.2; Source: Ericsson; Document for: Discussion.
3GPP TSG RAN Rel-18 workshop; RWS-210193; Electronic Meeting, Jun. 28-Jul. 2, 2021; URLLC/IIoT Enhancements for Rel-18; Agenda Item: 4.2; Source: FGI, Asia Pacific Telecom; Document for: Discussion.
3GPP TSG RAN Rel-18 workshop; Jun. 28-Jul. 2, 2021; Release 18 Broadband URLLC; Agenda Item: 4.2; RWS-210304; Source: Sony.
3GPP TSG RAN Rel-18 workshop; RWS-210350; Electronic Meeting, Jun. 28-Jul. 2, 2021; Requirements to URLLC, positioning and perception for automotive industry; CMCC, BMW Brilliance Automotive.
3GPP TSG RAN Rel-18 workshop; RWS-210377; Jun. 28-Jul. 2, 2021; Rel 18 URLLC/IIOT; Agenda Item: 4.2; Source: Intel Corporation; Document for: Discussion.
3GPP TSG RAN Rel-18 workshop; RWS-210277; Electronic Meeting, Jun. 28-Jul. 2, 2021; Agenda Item: 4.2; Document for: Discussion; Views on Rel-18 eMTC and URLLC items; SoftBank.
3GPP TSG RAN Rel-18 workshop; RWS-210442; Electronic Meeting, Jun. 28-Jul. 2, 2021; Source: Huawei, HiSilicon; Title: Complementary TDD and URLLC enhancements for NR; Agenda item: 4.2; Document for: Discussion and decision.
3GPP TSG RAN Rel-18 workshop; RWS-210067; Electronic Meeting, Jun. 28-Jul. 2, 2021; Agenda Item: 4.3; Source: Spreadtrum Communications; Title: IIoT/URLLC enhancements for R18; Document for: Discussion and decision.
3GPP TSG RAN Rel-18 workshop; RWS-210528; Electronic Meeting, Jun. 28-Jul. 2, 2021; Multi-carrier scheduling for Rel-18; Agenda Item: 4.1; Source: Lenovo, Motorola Mobility; Document for: Discussion.

* cited by examiner

ENHANCED CROSS-CARRIER PROCESSES

CROSS-REFERENCE TO RELATED APPLICATIONS

This application claims the benefit of U.S. Provisional Application No. 63/234,550, filed Aug. 18, 2021, which is hereby incorporated by reference in its entirety.

DETAILED DESCRIPTION

The exemplary embodiments of the disclosed technology enable enhanced cross-carrier processes for a wireless device and/or one or more base stations. The exemplary disclosed embodiments may be implemented in the technical field of wireless communication systems. More particularly, the embodiments of the disclosed technology may enhance processes associated with cross-carrier retransmission or repetition.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
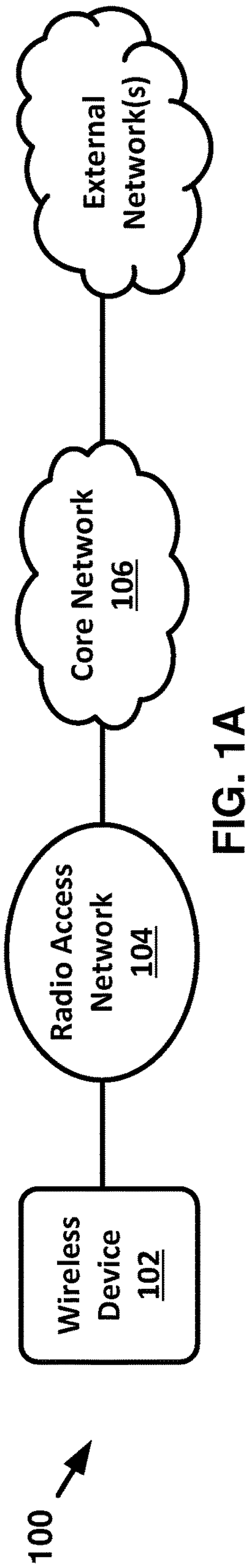
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP)

is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
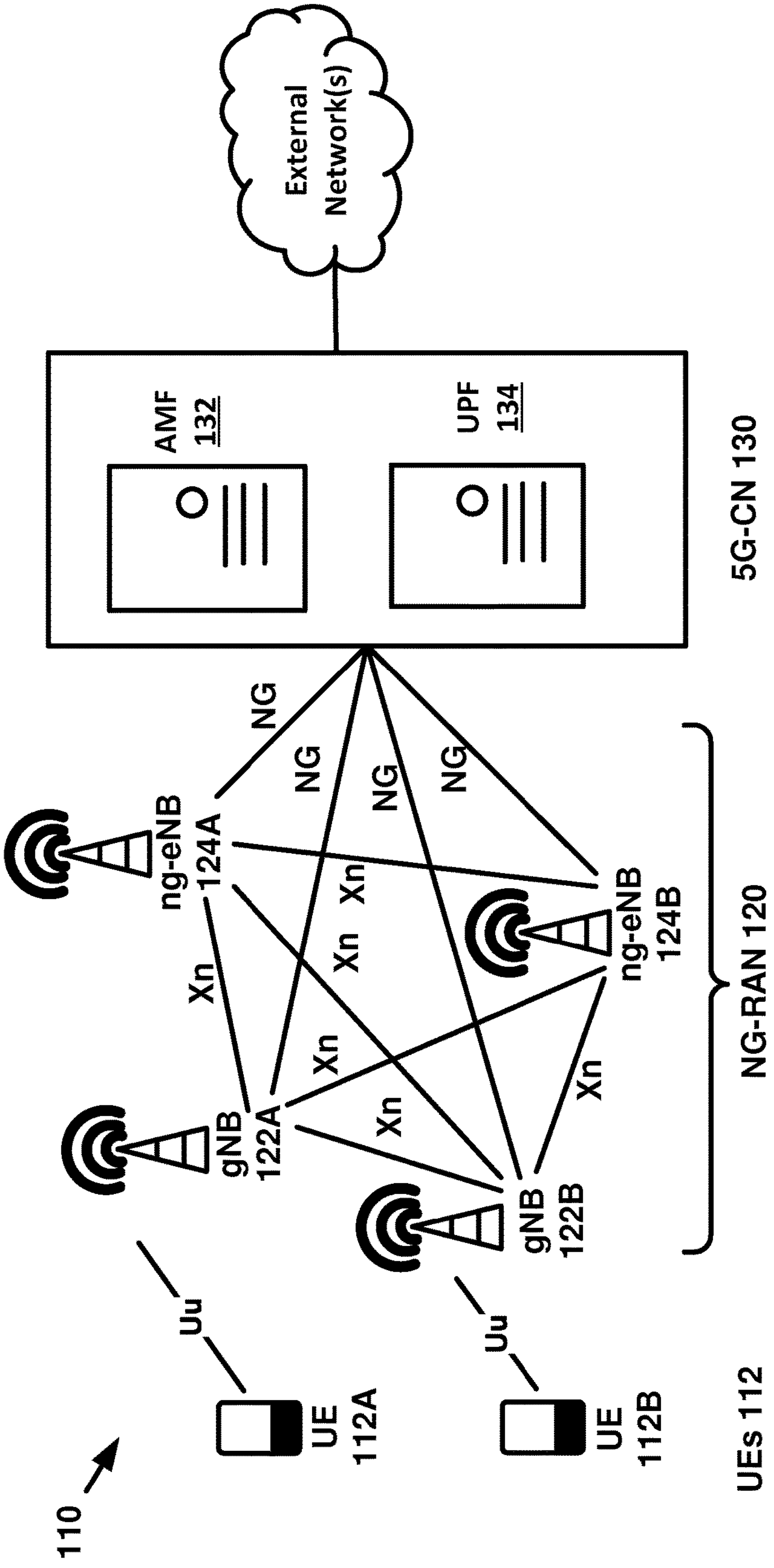

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
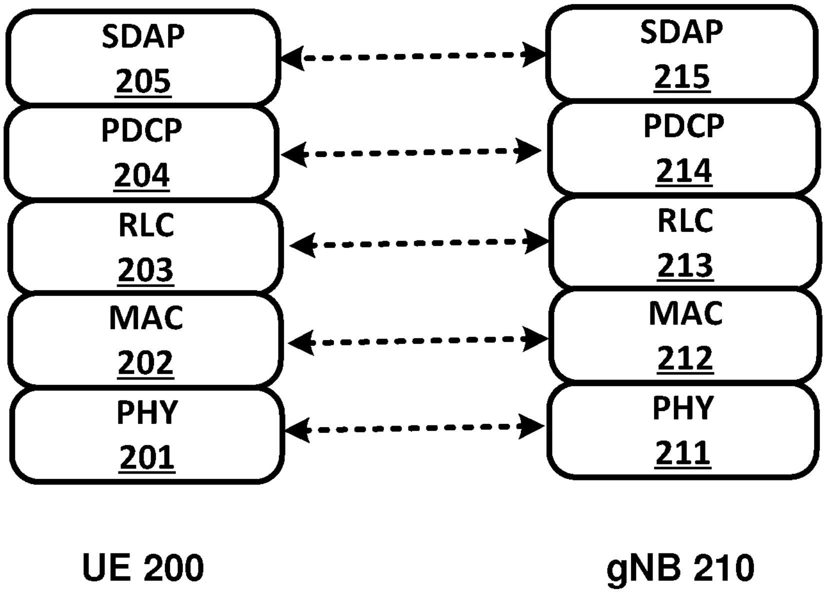
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
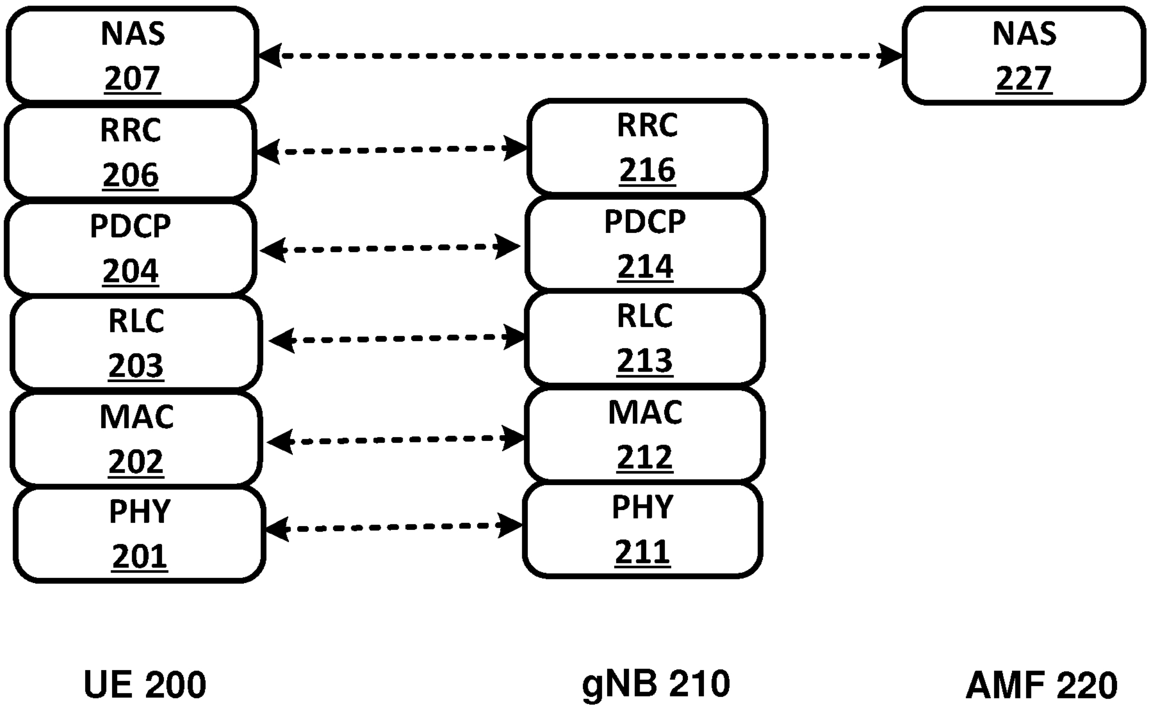

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
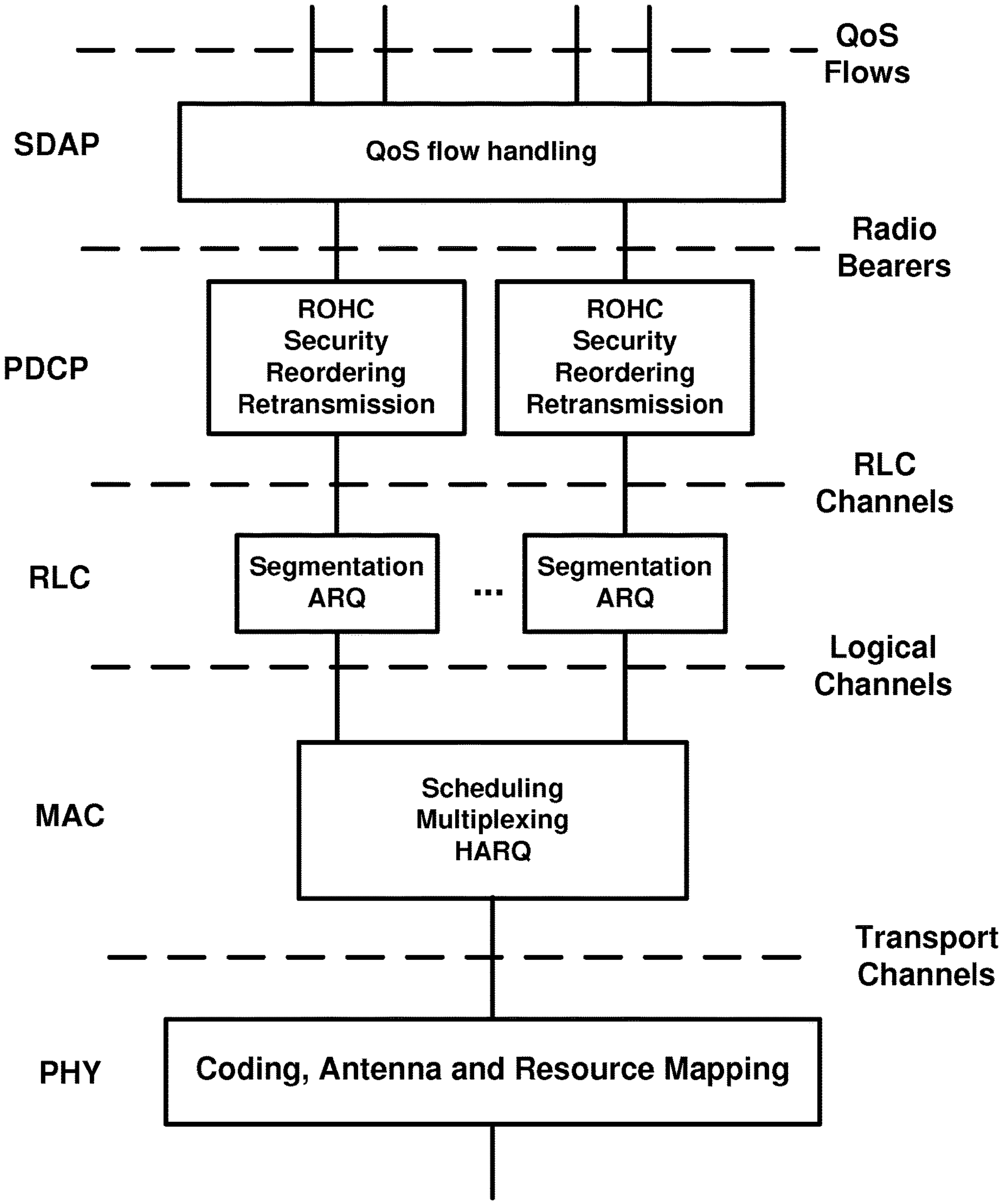
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
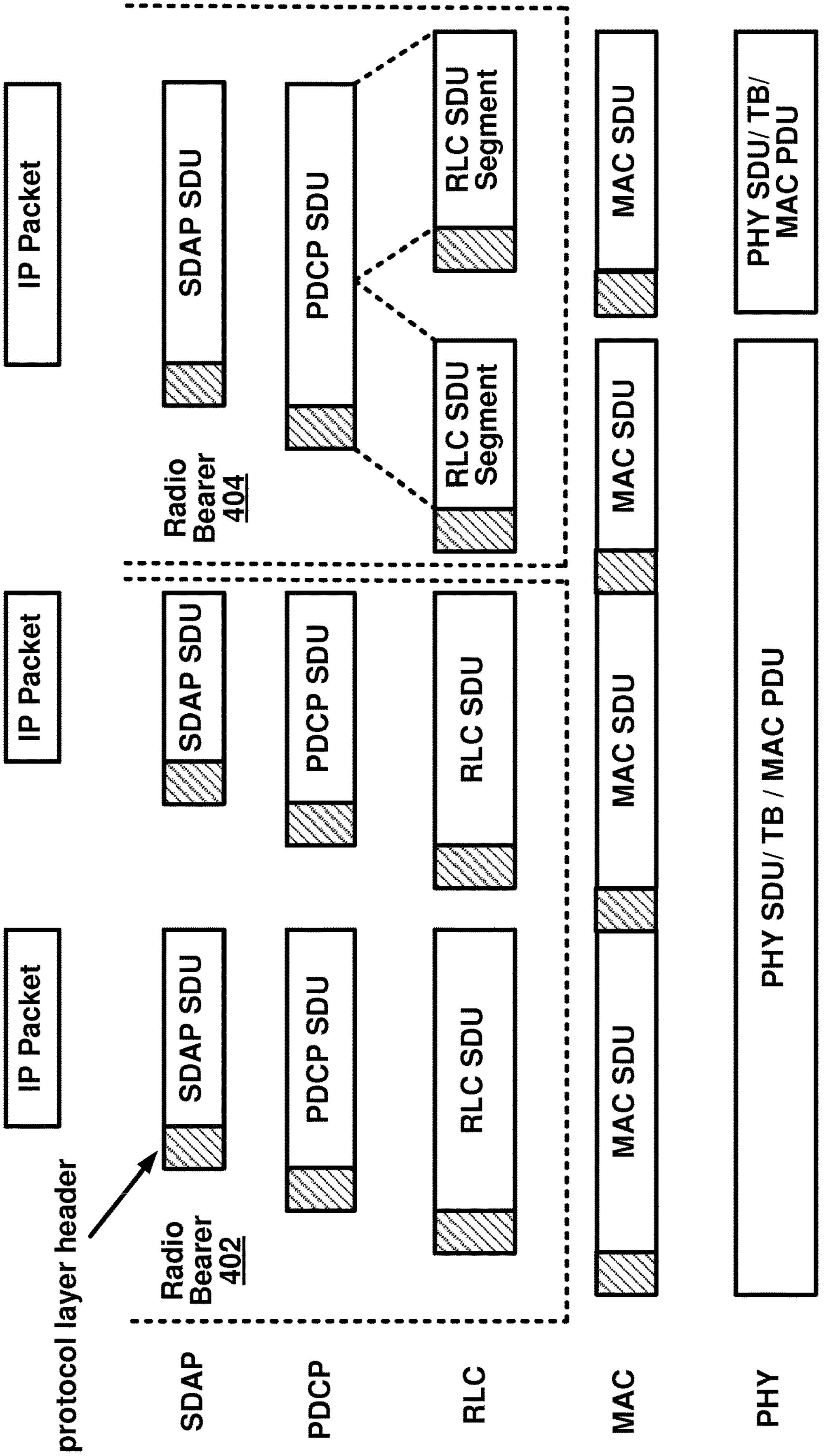
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
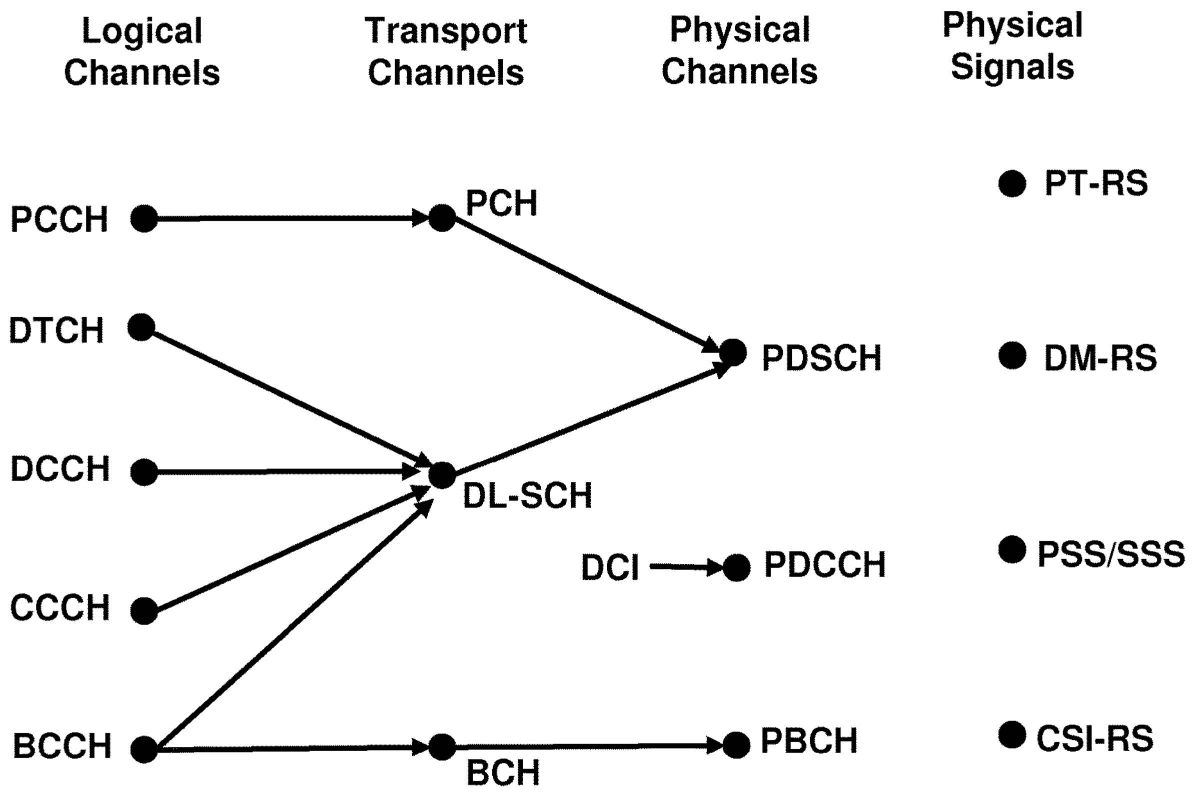
FIG. 5A shows example mapping of channels between layers of the protocol stack and different physical signals in downlink in accordance with several of various embodiments of the present disclosure.
Figure 5B:
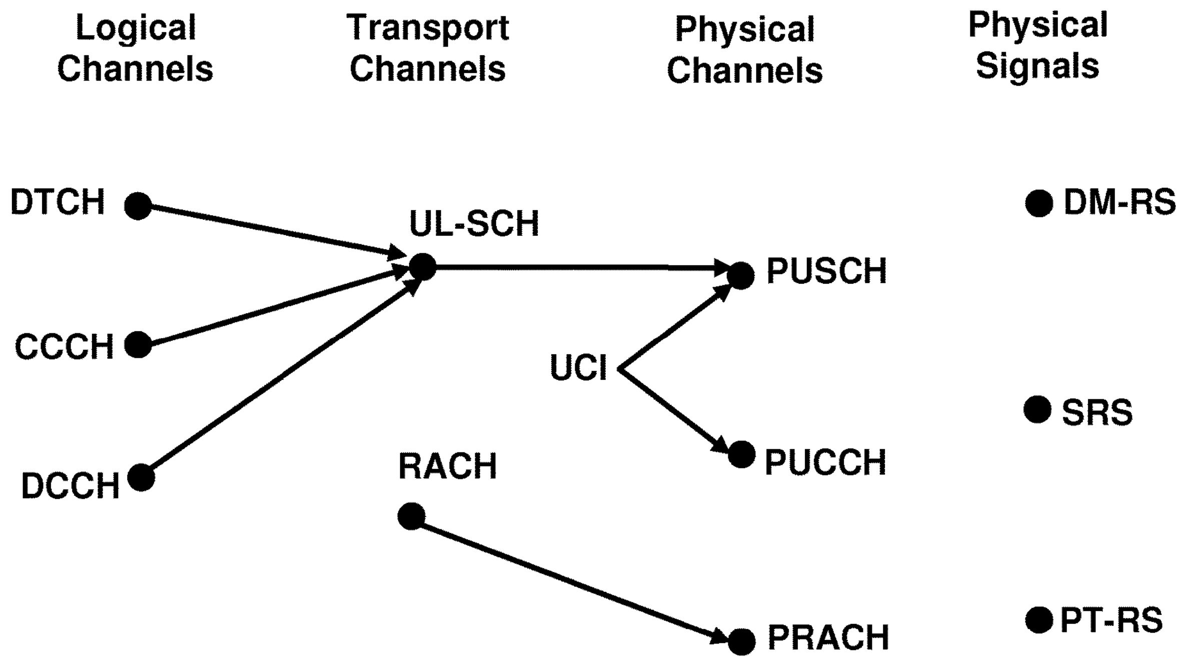
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
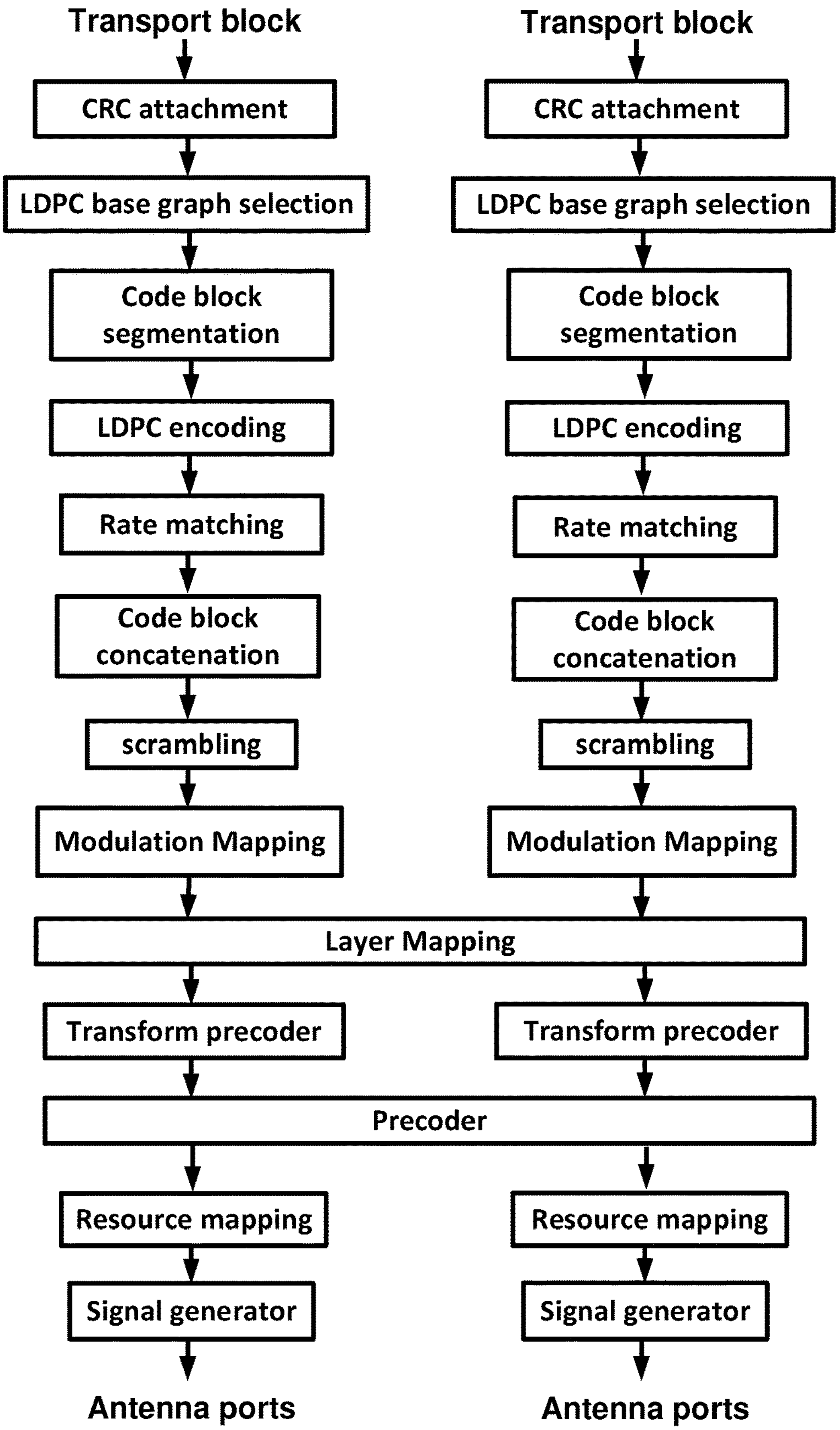
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
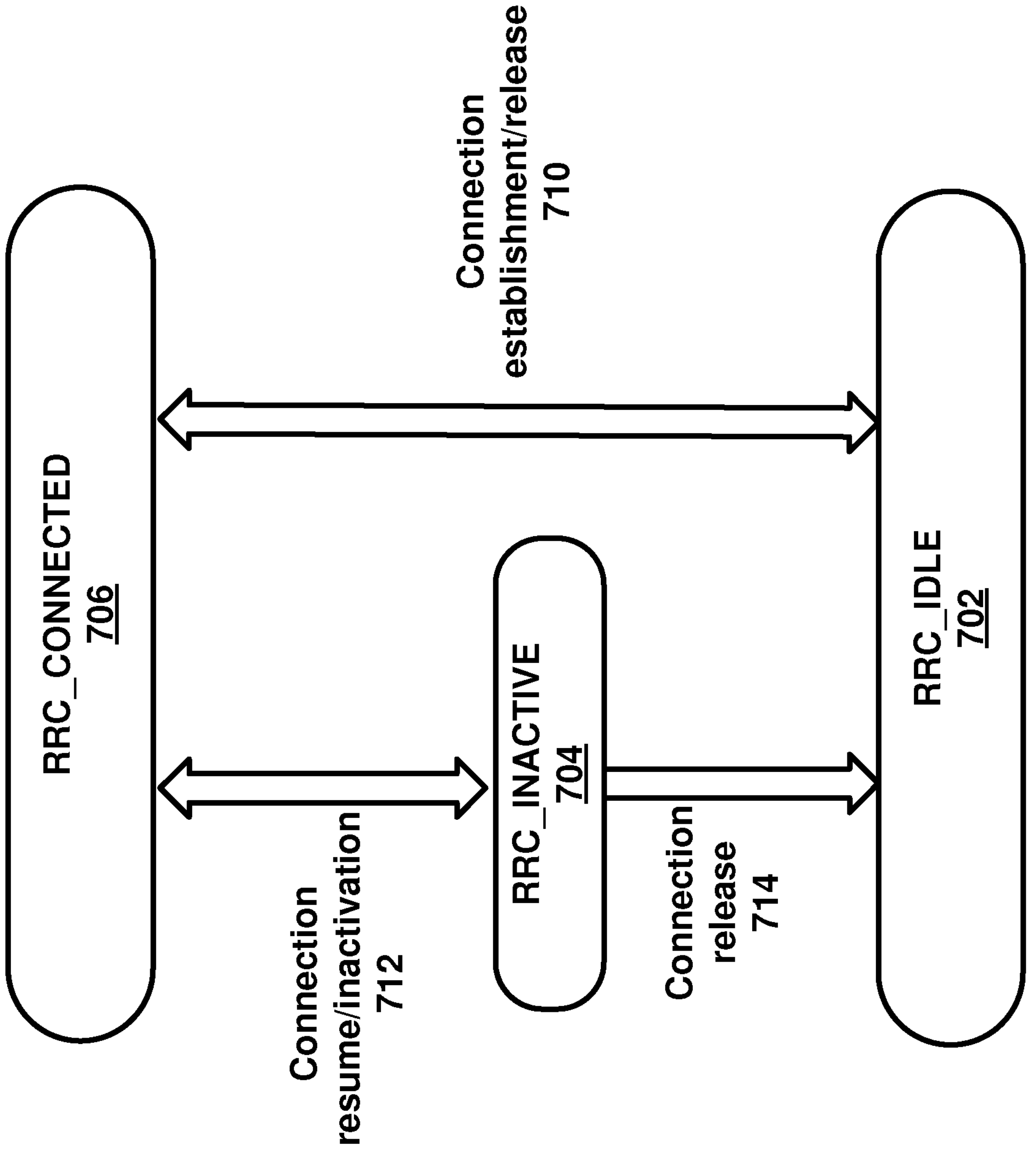
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16 QAM), 64 QAM and 256 QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f=2^{\mu}$. 15 KHz (μ=0, 1, 2, . . . ). Example subcarrier spacings used in NR include 15 KHz (μ=0), 30 KHz (μ=1), 60 KHz (μ=2), 120 KHz (μ=3) and 240 KHz (μ=4). As discussed before, a duration of OFDM symbol is inversely proportional to the subcarrier spacing and therefor OFDM symbol duration may depend on the numerology (e.g., the μ value).

Figure 8:
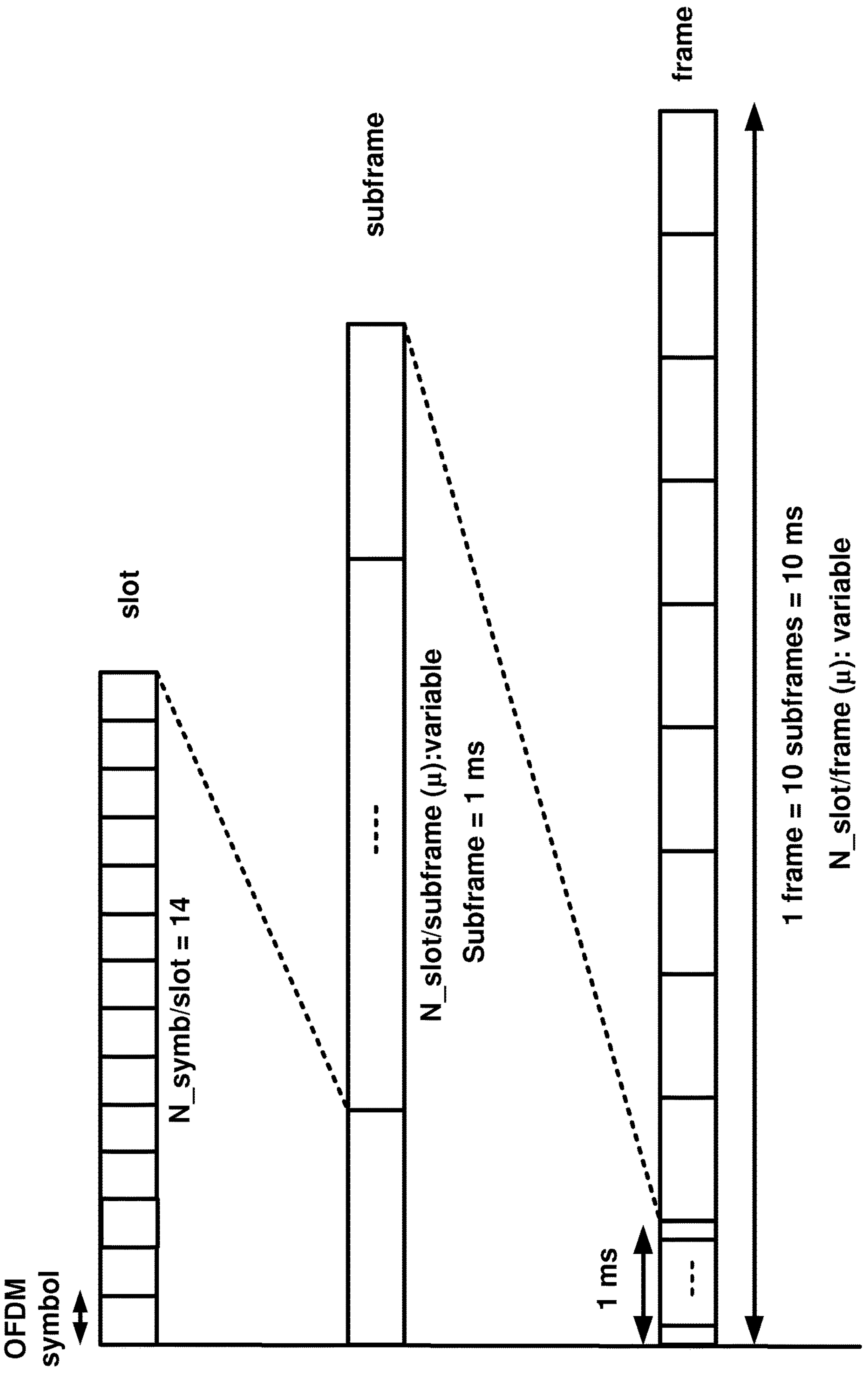
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $$N_{symb}^{slot}$$

OFDM symbols, wherein the $$N_{symb}^{slot}$$

may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $$N_{slot}^{subframe,\mu}$$

and the number of symbols per subframe may be expressed as $$N_{symb}^{subframe,\mu}=N_{symb}^{slot}N_{slot}^{subframe,\mu}.$$

A frame may have a duration of 10 ms and may consist of 10 subframes. The number of slots per frame may depend on the numerology and therefore may be variable. The number of slots per frame may generally be expressed as $$N_{slot}^{subframe,\mu}.$$

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
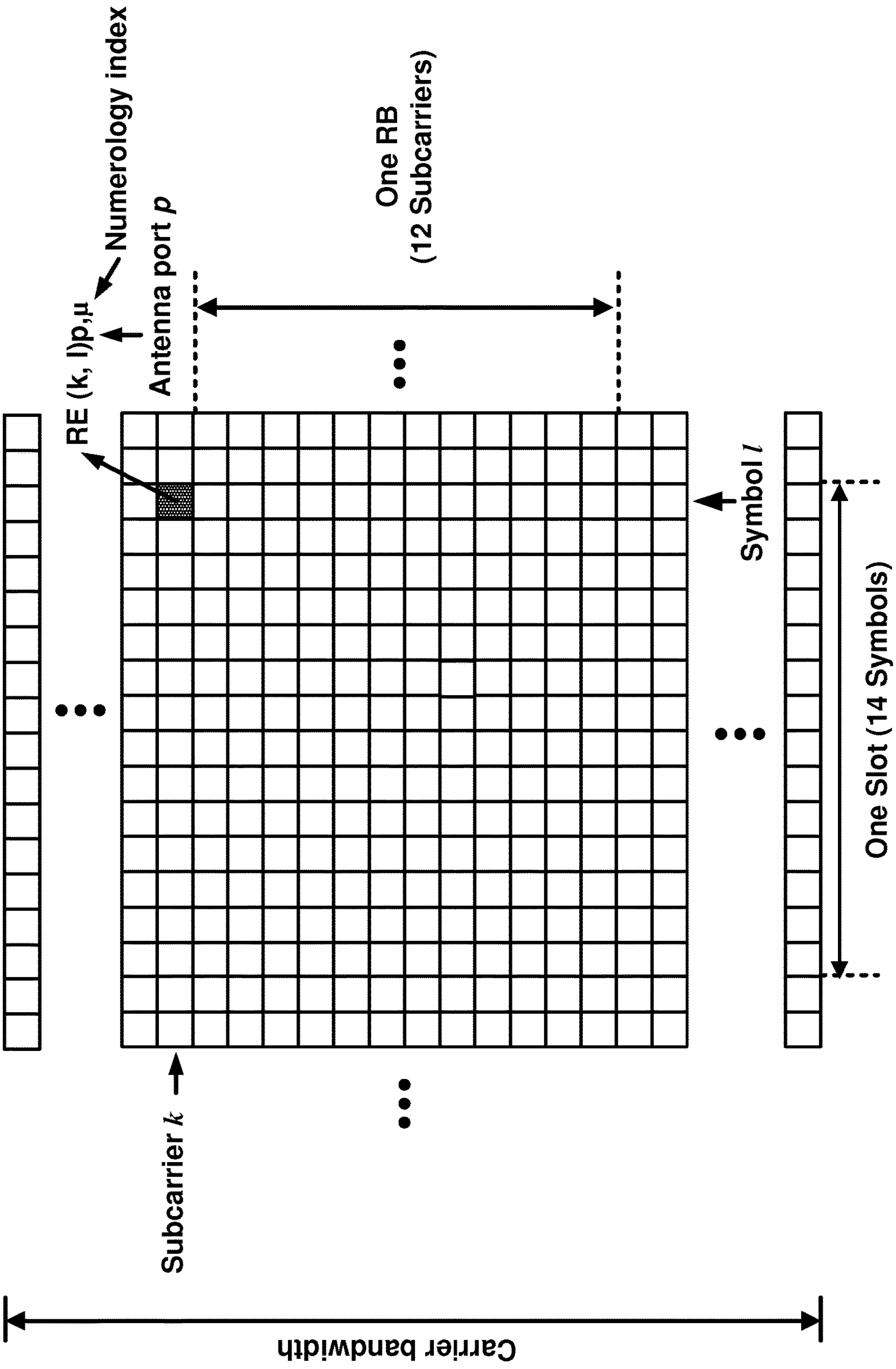
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k, l)_{p,\mu}$ where k is the index of a subcarrier in the frequency domain and l may refer to the symbol position in the time domain relative to some reference point. A resource block may be defined as $$N_{SC}^{RB}=12$$

subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
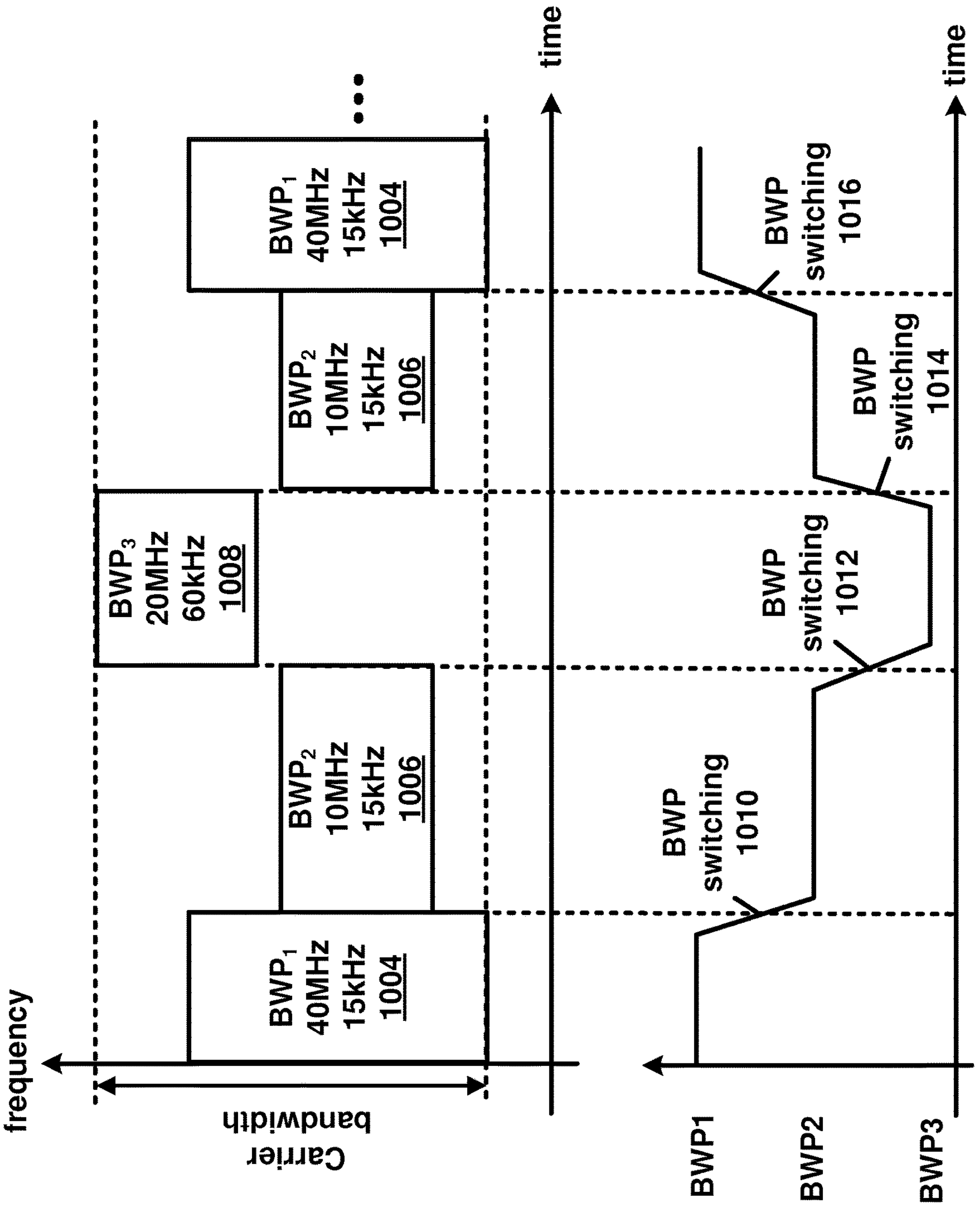
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
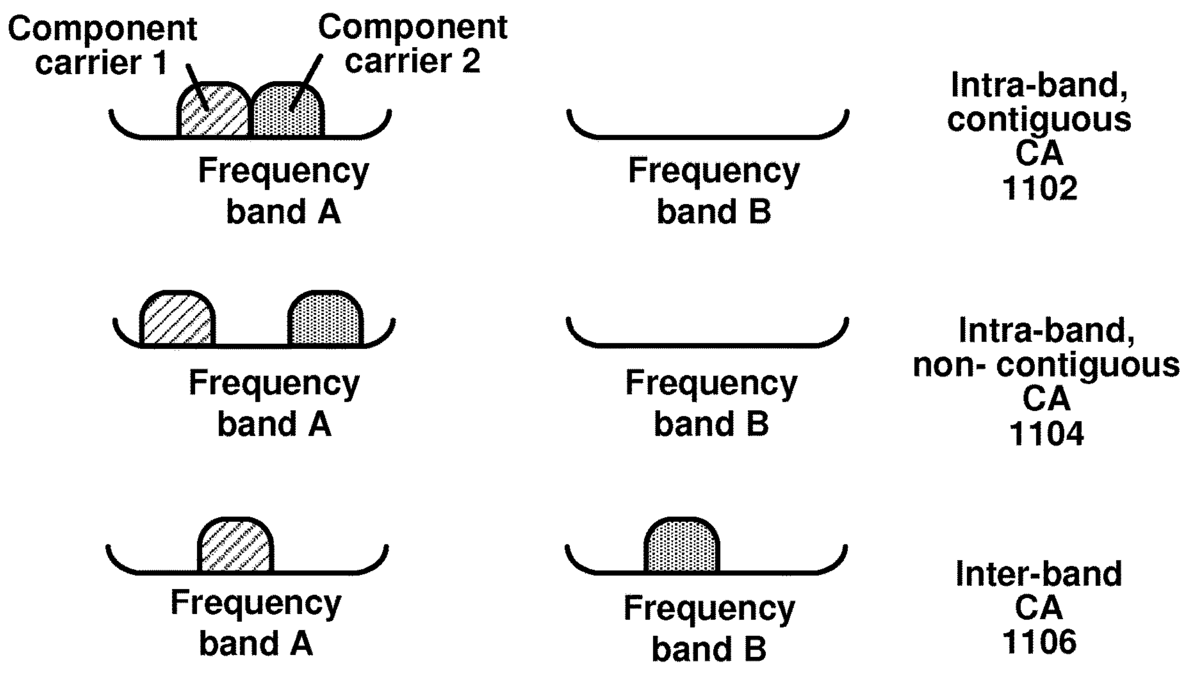
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
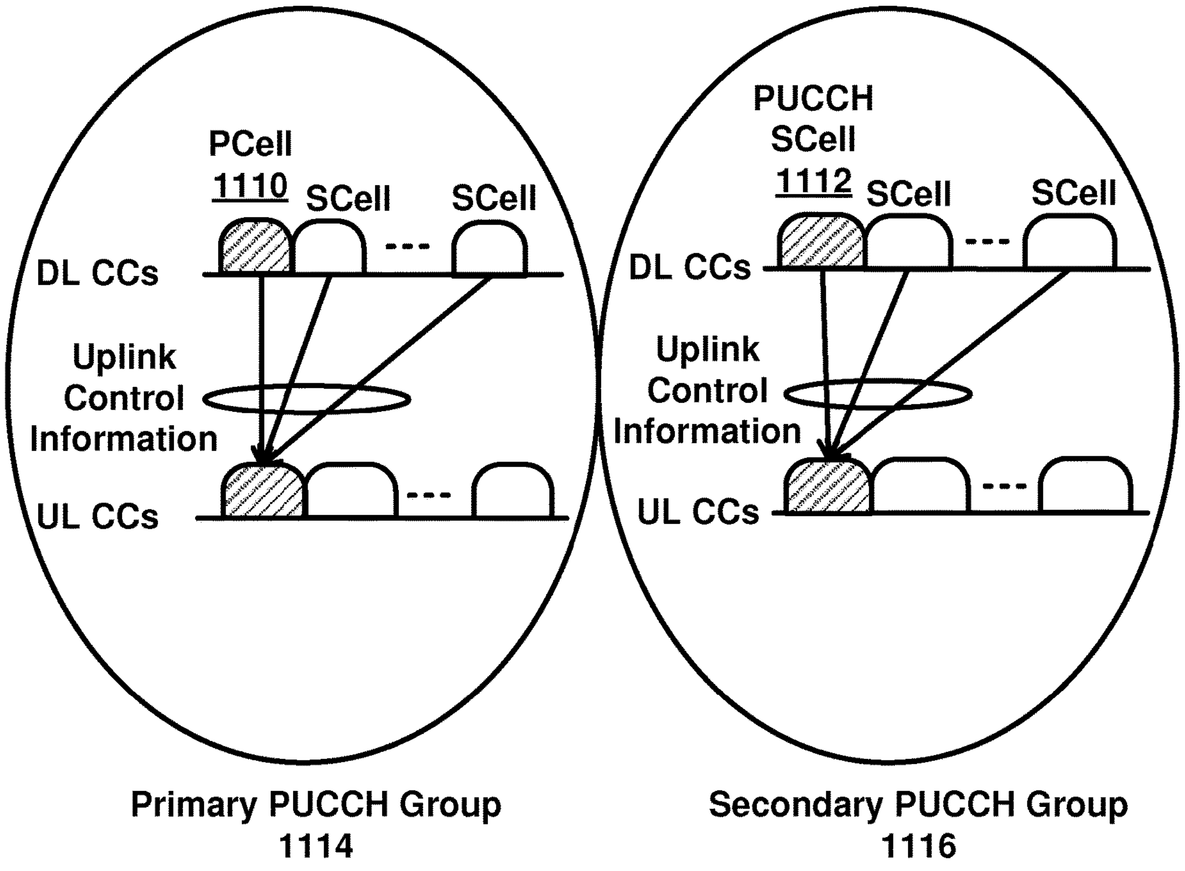
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figure 12C:
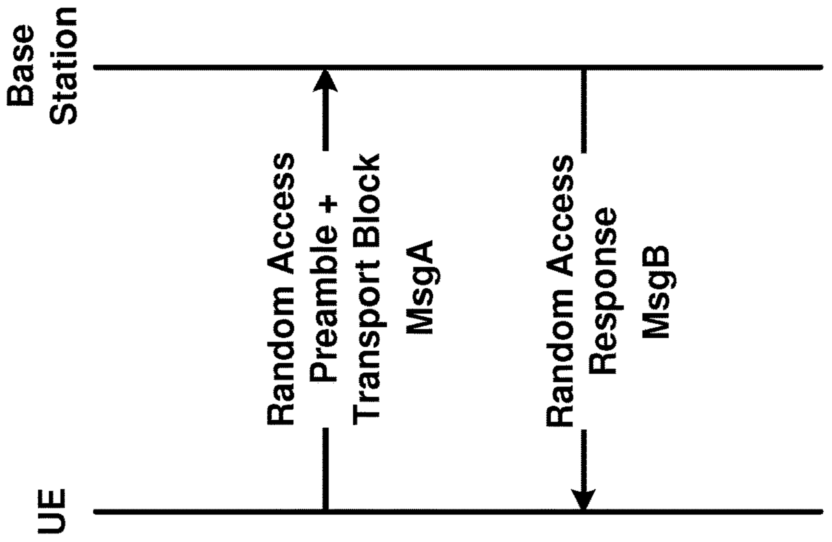
FIG. 12A, FIG. 12B and FIG. 12C show example random access processes in accordance with several of various embodiments of the present disclosure.
Figure 12B:
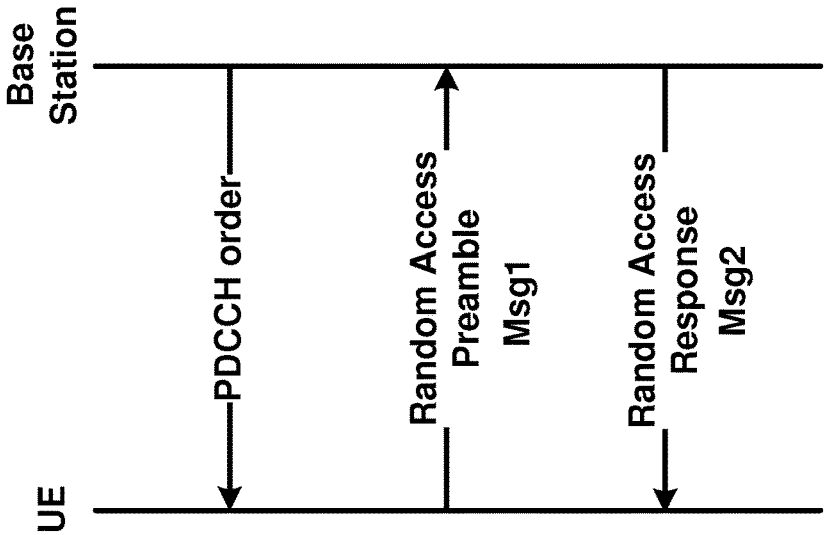
Figure 12A:
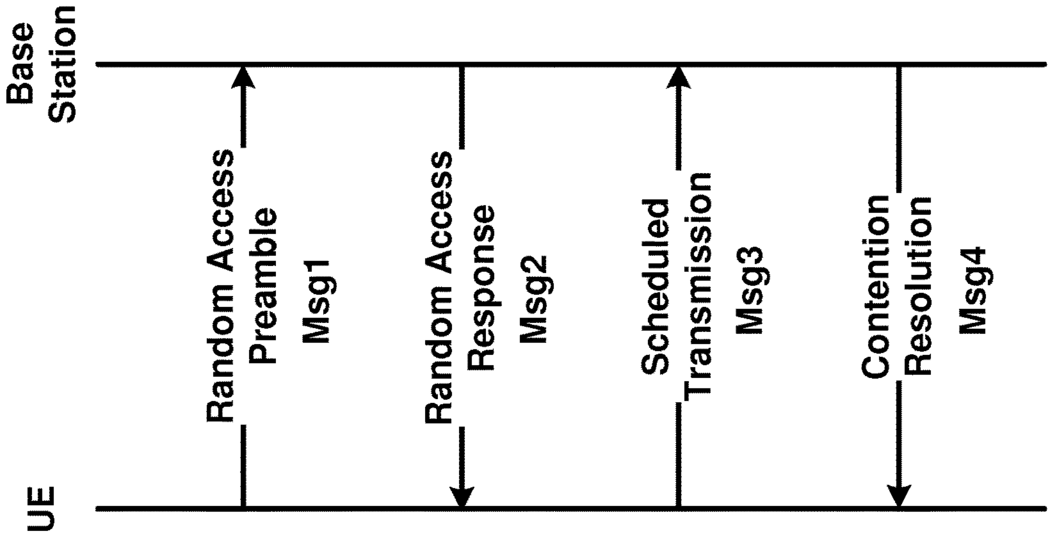

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
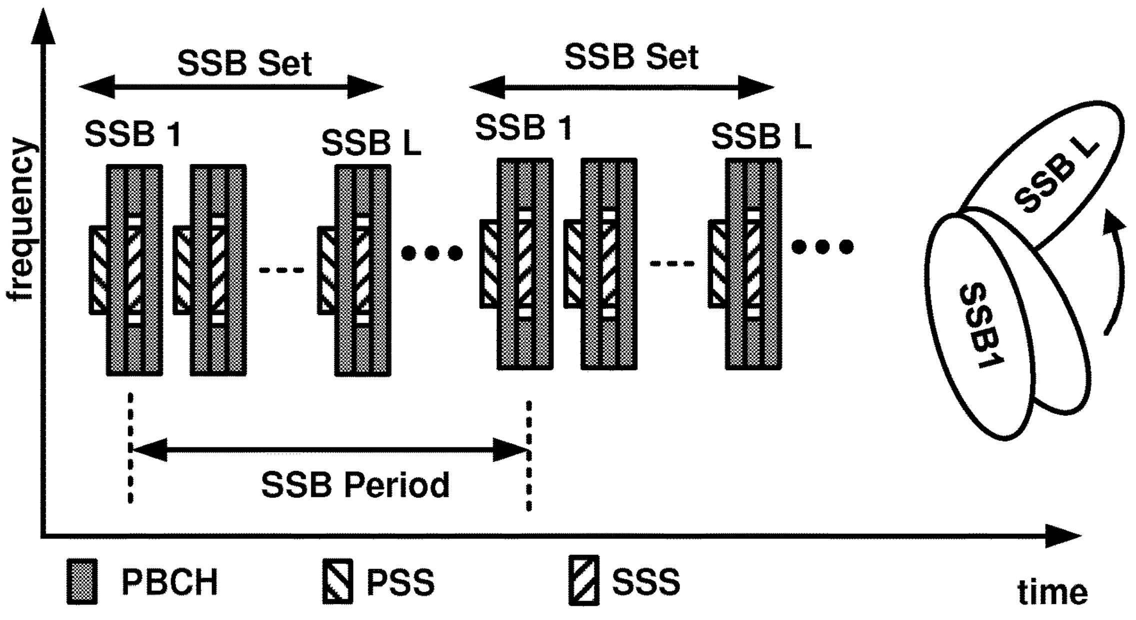
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
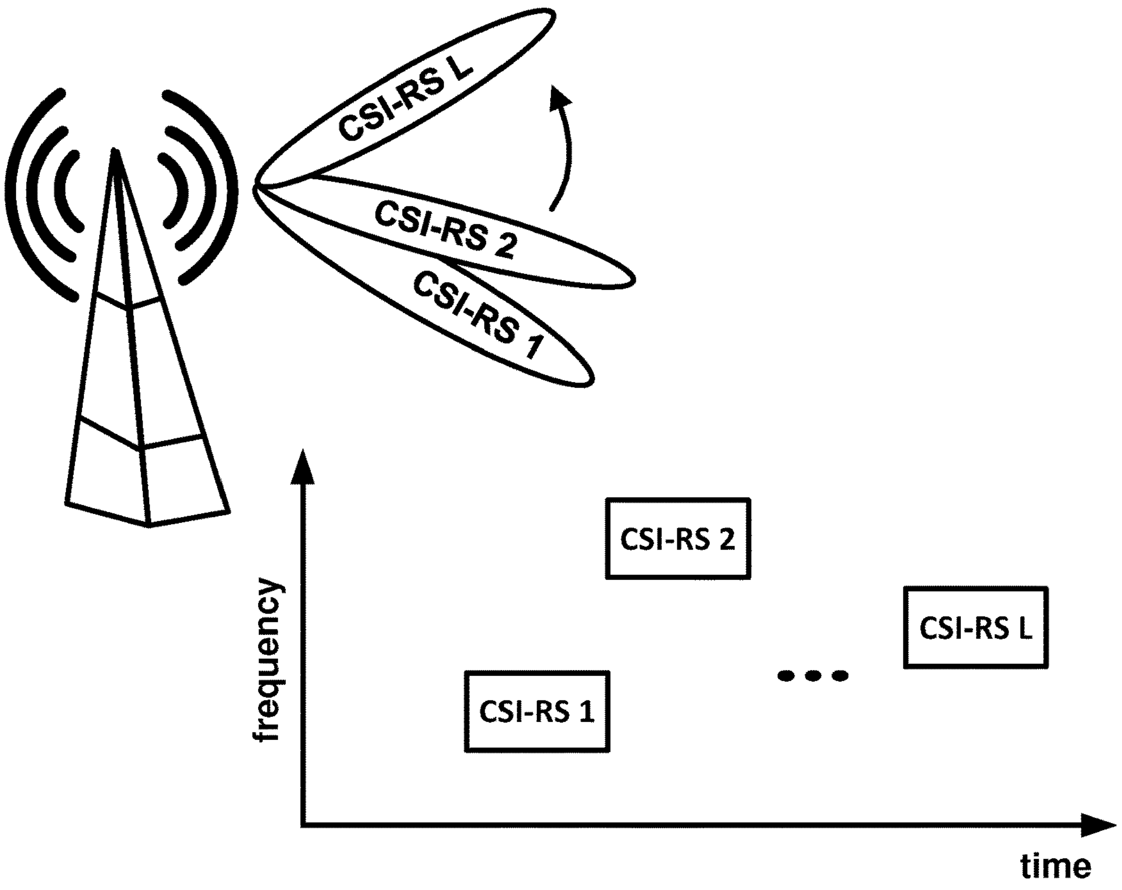
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
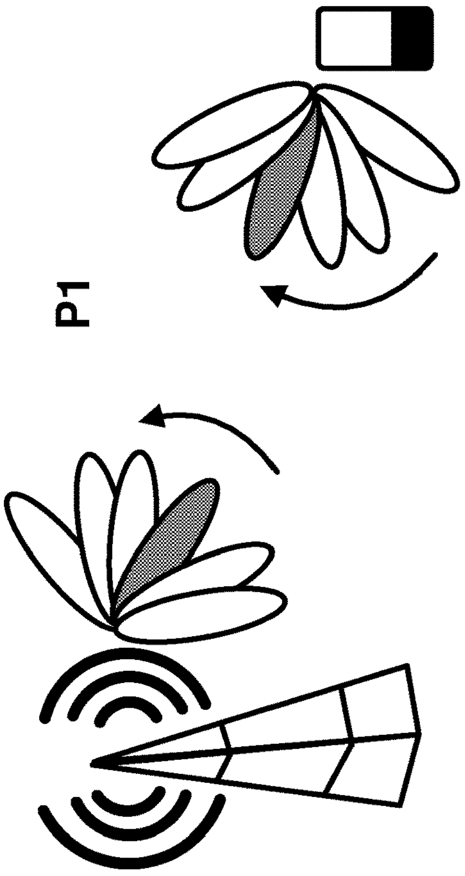
FIG. 14A, FIG. 14B and FIG. 14C show example beam management processes in accordance with several of various embodiments of the present disclosure.
Figure 14B:
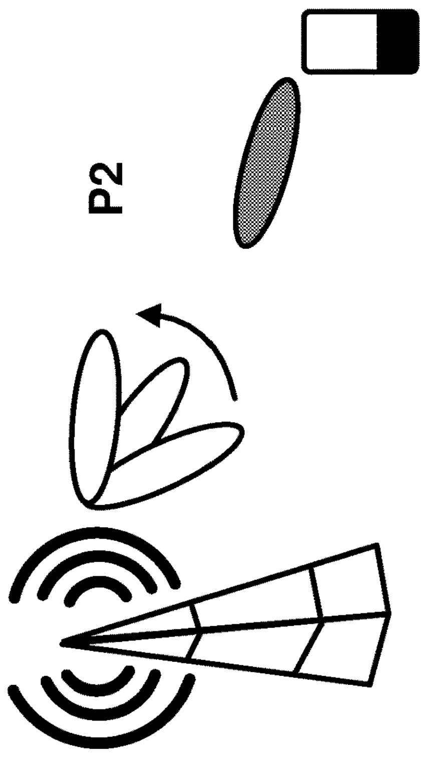
Figure 14C:
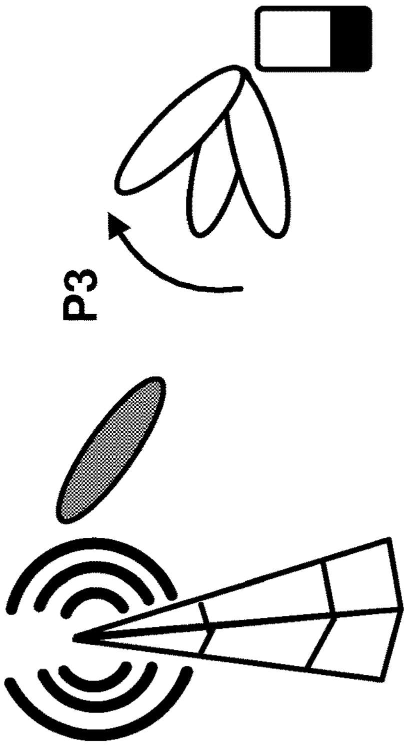

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
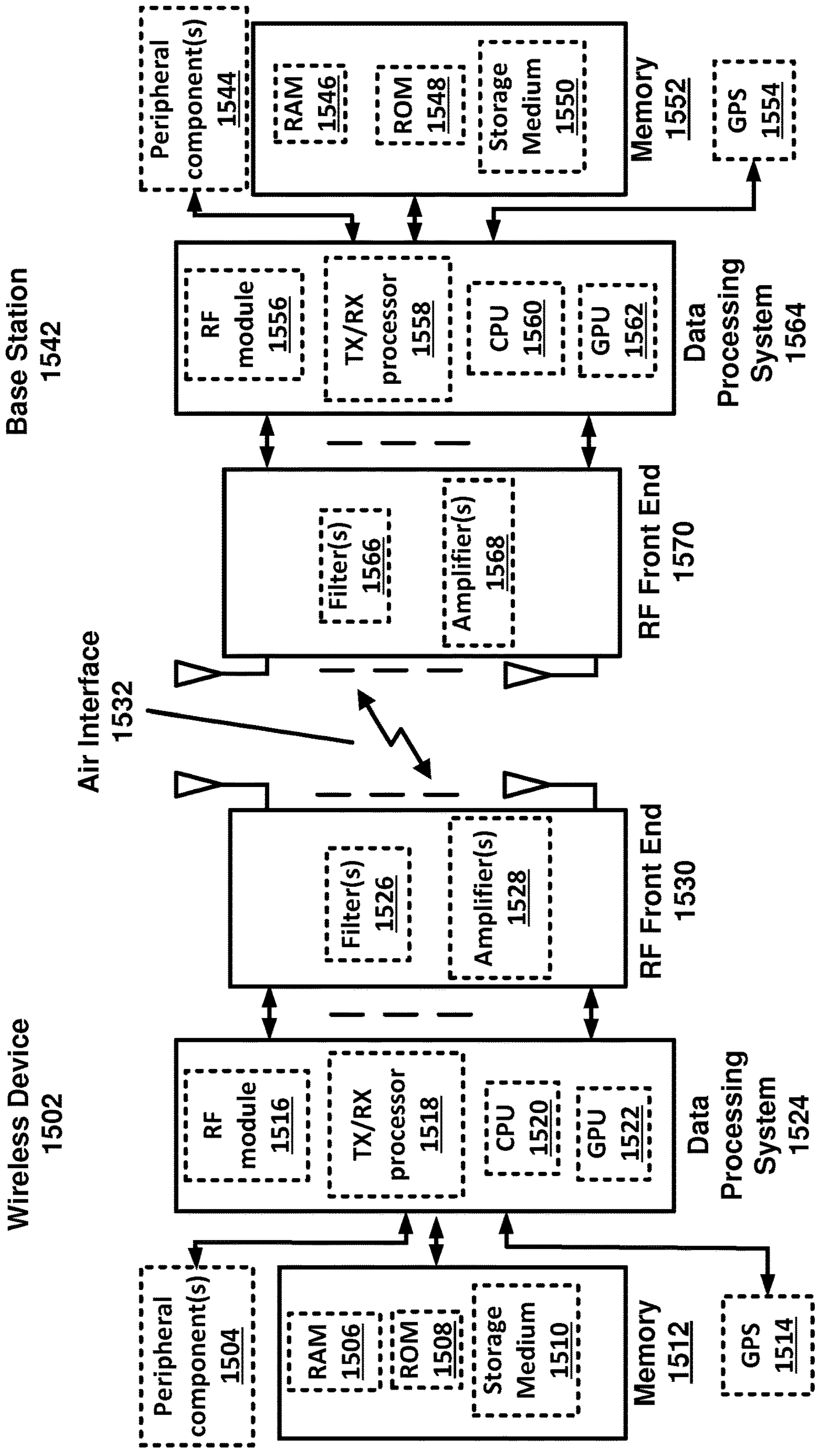
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a MAC entity may include a HARQ entity for a Serving Cell, which may maintain a number of parallel HARQ processes. A HARQ process may be associated with a HARQ process identifier. The HARQ entity may direct HARQ information and associated TBs received on the DL-SCH to the corresponding HARQ processes.

In an example, the number of parallel DL HARQ processes per HARQ entity may be pre-configured. A dedicated broadcast HARQ process may be used for BCCH.

In an example, the HARQ process may support one TB when the physical layer is not configured for downlink spatial multiplexing. In an example, the HARQ process may support one or two TBs when the physical layer is configured for downlink spatial multiplexing.

In an example, the HARQ process may support one or two TBs when the physical layer is configured for downlink spatial multiplexing.

In an example, when the MAC entity is configured with pdsch-AggregationFactor>1, the parameter pdsch-AggregationFactor may provide the number of transmissions of a TB within a bundle of the downlink assignment. In an example, the bundling operation may rely on the HARQ entity for invoking the same HARQ process for a transmission that is part of the same bundle. After the initial transmission, pdsch-AggregationFactor−1 HARQ retransmissions may follow within a bundle.

In an example, a MAC entity may include a HARQ entity for a Serving Cell with configured uplink (including the case when it is configured with supplementaryUplink), which may maintain a number of parallel HARQ processes.

In an example, the number of parallel UL HARQ processes per HARQ entity may be pre-configured.

In an example, a HARQ process may support one TB.

In an example, a HARQ process may be associated with a HARQ process identifier. For UL transmission with UL grant in RA Response or for UL transmission for MSGA payload, HARQ process identifier 0 may be used.

In an example, when a single DCI is used to schedule multiple PUSCH, the UE may be allowed to map generated TB(s) internally to different HARQ processes in case of listen-before-talk (LBT) failure(s), for example, a UE may transmit a new TB on any HARQ process in the grants that have the same TBS, the same RV and the NDIs indicate new transmission.

In an example, the maximum number of transmissions of a TB within a bundle of the dynamic grant or configured grant may be given by REPETITION_NUMBER as follows: for a dynamic grant, REPETITION_NUMBER may be set to a value provided by lower layers; for a configured grant, REPETITION_NUMBER may be set to a value provided by lower layers.

In an example, if REPETITION_NUMBER>1, after the first transmission within a bundle, at most REPETITION_NUMBER−1 HARQ retransmissions may follow within the bundle. In an example, for both dynamic grant and configured uplink grant, bundling operation may rely on the HARQ entity for invoking the same HARQ process for a transmission that is part of the same bundle. Within a bundle, HARQ retransmissions may be triggered without waiting for feedback from previous transmission according to REPETITION_NUMBER for a dynamic grant or configured uplink grant unless. In an example, a transmission within a bundle may be a separate uplink grant delivered to the HARQ entity.

In an example, for a transmission within a bundle of the dynamic grant, the sequence of redundancy versions may be determined. For a transmission within a bundle of the configured uplink grant, the sequence of redundancy versions may be determined.

In an example, when the UE is scheduled to receive PDSCH by a DCI, the Time domain resource assignment field value m of the DCI may provide a row index m+1 to an allocation table. The indexed row may define the slot offset $K_0$, the start and length indicator SLIV, or directly the start symbol S and the allocation length L, and the PDSCH mapping type to be assumed in the PDSCH reception.

In an example, given the parameter values of the indexed row: the slot allocated for the PDSCH may be Ks, where $K_S =$ $$\left\lfloor n\cdot\frac{2^{\mu_{PDSCH}}}{2^{\mu_{PDCCH}}}\right\rfloor + K_0 + \left\lfloor\left(\frac{N^{CA}_{slot,offset,PDCCH}}{2^{\mu_{offset,PDCCH}}} - \frac{N^{CA}_{slot,offset,PDSCH}}{2^{\mu_{offset,PDSCH}}}\right)\cdot 2^{\mu_{PDSCH}}\right\rfloor,$$

if UE is configured with ca-SlotOffset for at least one of the scheduled and scheduling cell, and $$K_S = \left\lfloor n\cdot\frac{2^{\mu_{PDSCH}}}{2^{\mu_{PDCCH}}}\right\rfloor + K_0,$$

otherwise, and where n is the slot with the scheduling DCI, and $K_0$ may be based on the numerology of PDSCH, and $\mu_{PDSCH}$ and $\mu_{PDCCH}$ may be the subcarrier spacing configurations for PDSCH and PDCCH, respectively, and $$N^{CA}_{slot,offset,PDCCH} \text{ and } \mu_{offset,PDCCH}$$

may be the $$N^{CA}_{slot,offset} \text{ and the } \mu_{offset},$$

respectively, which may be determined by higher-layer configured ca-SlotOffset, for the cell receiving the PDCCH respectively, $$N^{CA}_{slot,offset,PDSCH} \text{ and } \mu_{offset,PDSCH} \text{ may be the } N^{CA}_{slot,offset} \text{ and the } \mu_{offset},$$

respectively, which may be determined by higher-layer configured ca-SlotOffset for the cell receiving the PDSCH.

In an example, the reference point $S_0$ for starting symbol S may be defined as: if configured with referenceOfSLIVDCI-1-2, and when receiving PDSCH scheduled by DCI format 1_2 with CRC scrambled by C-RNTI, MCS-C-RNTI, CS-RNTI with $K_0=0$, and PDSCH mapping Type B, the starting symbol S may be relative to the starting symbol $S_0$ of the PDCCH monitoring occasion where DCI format 1_2 is detected; otherwise, the starting symbol S may be relative to the start of the slot using $S_0=0$.

In an example, the number of consecutive symbols L counting from the starting symbol S allocated for the PDSCH may be determined from the start and length indicator SLIV:

```
if (L − 1) ≤ 7 then
  SLIV = 14 · (L − 1) + S
else
  SLIV = 14 · (14 − L + 1) + (14 − 1 − S)
where 0 < L ≤ 14 − S, and
```

In an example, the PDSCH mapping type may be set to Type A or Type B.

In an example, the UE may consider the S and L combinations satisfying $S_0+S+L\leq 14$ for normal cyclic prefix and $S_0+S+L\leq 12$ for extended cyclic prefix as valid PDSCH allocations.

In an example, when receiving PDSCH scheduled by DCI format 1_1 or 1_2 in PDCCH with CRC scrambled by C-RNTI, MCS-C-RNTI, or CS-RNTI with NDI=1, if the UE is configured with pdsch-AggregationFactor in pdsch-config, the same symbol allocation may be applied across the pdsch-AggregationFactor consecutive slots. When receiving PDSCH scheduled by DCI format 1_1 or 1_2 in PDCCH with CRC scrambled by CS-RNTI with NDI=0, or PDSCH scheduled without corresponding PDCCH transmission using sps-Config and activated by DCI format 1_1 or 1_2, the same symbol allocation may be applied across the pdsch-AggregationFactor, in sps-Config if configured, or across the pdsch-AggregationFactor in pdsch-config otherwise, consecutive slots. In an example, the UE may expect that the TB is repeated within each symbol allocation among each of the pdsch-AggregationFactor consecutive slots and the PDSCH may be limited to a single transmission layer. For PDSCH scheduled by DCI format 1_1 or 1_2 in PDCCH with CRC scrambled by CS-RNTI with NDI=0, or PDSCH scheduled without corresponding PDCCH transmission using sps-Config and activated by DCI format 1_1 or 1_2, the UE may not be expected to be configured with the time duration for the reception of pdsch-AggregationFactor repetitions, in sps-Config if configured, or across the pdsch-AggregationFactor in pdsch-config otherwise, larger than the time duration derived by the periodicity P obtained from the corresponding sps-Config. The redundancy version to be applied on the $n^{th}$ transmission occasion of the TB, where n=0, 1, . . . pdsch-AggregationFactor−1, may be determined according to a table and "$rv_{id}$ indicated by the DCI scheduling the PDSCH" is assumed to be 0 for PDSCH scheduled without corresponding PDCCH transmission using sps-Config and activated by DCI format 1_1 or 1_2.

In an example, if a UE is configured with higher layer parameter repetitionNumber or if the UE is configured by repetitionScheme set to one of 'fdmSchemeA', 'fdmSchemeB' and 'tdmSchemeA', the UE does not expect to be configured with pdsch-AggregationFactor.

In an example, when a UE is configured by the higher layer parameter repetitionScheme set to 'tdmSchemeA' and indicated DM-RS port(s) within one CDM group in the DCI field 'Antenna Port(s)', the number of PDSCH transmission occasions is derived by the number of TCI states indicated by the DCI field 'Transmission Configuration Indication' of the scheduling DCI.

In an example, if two TCI states are indicated by the DCI field 'Transmission Configuration Indication', the UE may be expected to receive two PDSCH transmission occasions, where the first TCI state may be applied to the first PDSCH transmission occasion. The second TCI state may be applied to the second PDSCH transmission occasion, and the second PDSCH transmission occasion may have the same number of symbols as the first PDSCH transmission occasion. In an example, if the UE is configured by the higher layers with a value $\bar{K}$ in StartingSymbolOffsetK, it may determine that the first symbol of the second PDSCH transmission occasion starts after $\bar{K}$ symbols from the last symbol of the first PDSCH transmission occasion. If the value $\bar{K}$ is not configured via the higher layer parameter StartingSymbolOffsetK, $\bar{K}=0$ may be assumed by the UE. The UE may not be expected to receive more than two PDSCH transmission layers for each PDSCH transmission occasion. For two PDSCH transmission occasions, the redundancy version to be applied is derived according to a table. The UE may expect the PDSCH mapping type indicated by DCI field 'Time domain resource assignment' to be mapping type B, and the indicated PDSCH mapping type may be applied to both PDSCH transmission occasions. Otherwise, the UE may be expected to receive a single PDSCH transmission occasion.

In an example, a UE may be configured by the higher layer parameter PDSCH-config that indicates at least one entry contains repetitionNumber in PDSCH-TimeDomainResourceAllocation. In an example, if two TCI states are indicated by the DCI field 'Transmission Configuration Indication' together with the DCI field 'Time domain resource assignment' indicating an entry which contains repetitionNumber in PDSCH-TimeDomainResourceAllocation and DM-RS port(s) within one CDM group in the DCI field 'Antenna Port(s)', the same SLIV may be applied for all PDSCH transmission occasions across the repetitionNumber consecutive slots, the first TCI state may be applied to the first PDSCH transmission occasion. In an example, when the value indicated by repetitionNumber in PDSCH-TimeDomainResourceAllocation equals to two, the second TCI state may be applied to the second PDSCH transmission occasion. When the value indicated by repetitionNumber in PDSCH-TimeDomainResourceAllocation is larger than two, the UE may be further configured to enable cyclicMapping or sequenticalMapping in tciMapping. When cyclicMapping is enabled, the first and second TCI states may be applied to the first and second PDSCH transmission occasions, respectively, and the same TCI mapping pattern may continue to the remaining PDSCH transmission occasions. When sequenticalMapping is enabled, first TCI state may be applied to the first and second PDSCH transmission occasions, and the second TCI state may be applied to the third and fourth PDSCH transmission occasions, and the same TCI mapping pattern may continue to the remaining PDSCH transmission occasions.

In an example, the UE may expect that each PDSCH transmission occasion is limited to two transmission layers. For PDSCH transmission occasions associated with the first TCI state, the redundancy version to be applied may be derived according to a table, where n may be counted only considering PDSCH transmission occasions associated with the first TCI state. The redundancy version for PDSCH transmission occasions associated with the second TCI state is derived according to a table, where additional shifting operation for each redundancy version $rv_s$ may be configured by higher layer parameter sequenceOffsetforRV and n may be counted only considering PDSCH transmission occasions associated with the second TCI state.

In an example, if one TCI state is indicated by the DCI field 'Transmission Configuration Indication' together with the DCI field 'Time domain resource assignment' indicating an entry which may contain repetitionNumber in PDSCH-TimeDomainResourceAllocation and DM-RS port(s) within one CDM group in the DCI field 'Antenna Port(s)', the same SLIV may be applied for PDSCH transmission occasions across the repetitionNumber consecutive slots, and the same TCI state may be applied to PDSCH transmission occasions. The UE may expect that a PDSCH transmission occasion may be limited to two transmission layers. For PDSCH transmission occasions, the redundancy version to be applied may be derived according to a table, where n may be counted considering PDSCH transmission occasions. Otherwise, the UE may be expected to receive a single PDSCH transmission occasion.

In an example, two downlink resource allocation schemes, type 0 and type 1, may be supported. The UE may assume that when the scheduling grant is received with DCI format 1_0, then downlink resource allocation type 1 may be used.

In an example, if the scheduling DCI is configured to indicate the downlink resource allocation type as part of the 'Frequency domain resource assignment' field by setting a higher layer parameter resourceAllocation in PDSCH-Config to 'dynamicSwitch', for DCI format 1_1 or setting a higher layer parameter resourceAllocationDCI-1-2 in PDSCH-Config to 'dynamicSwitch' for DCI format 1_2, the UE may use downlink resource allocation type 0 or type 1 as defined by this DCI field. Otherwise, the UE may use the downlink frequency resource allocation type as defined by the higher layer parameter resourceAllocation for DCI format 1_1 or by the higher layer parameter resourceAllocationDCI-1-2 for DCI format 1_2.

In an example, if a bandwidth part indicator field is not configured in the scheduling DCI or the UE may not support active BWP change via DCI, the RB indexing for downlink type 0 and type 1 resource allocation may be determined within the UE's active bandwidth part. If a bandwidth part indicator field is configured in the scheduling DCI and the UE supports active BWP change via DCI, the RB indexing for downlink type 0 and type 1 resource allocation may be determined within the UE's bandwidth part indicated by bandwidth part indicator field value in the DCI. The UE may upon detection of PDCCH intended for the UE determine first the downlink bandwidth part and then the resource allocation within the bandwidth part.

In an example, for a PDSCH scheduled with a DCI format 1_0 in any type of PDCCH common search space, regardless of which bandwidth part is the active bandwidth part, RB numbering may start from the lowest RB of the CORESET in which the DCI was received; otherwise RB numbering may start from the lowest RB in the determined downlink bandwidth part.

In an example, in downlink resource allocation of type 0, the resource block assignment information may include a bitmap indicating the Resource Block Groups (RBGs) that are allocated to the scheduled UE where a RBG is a set of consecutive virtual resource blocks defined by higher layer parameter rbg-Size configured by PDSCH-Config and the size of the bandwidth part.

In an example, in downlink resource allocation of type 1, the resource block assignment information may indicate to a scheduled UE a set of contiguously allocated non-interleaved or interleaved virtual resource blocks within the active bandwidth part of size $$N_{BWP}^{size}$$

PRBs except for the case when DCI format 1_0 is decoded in any common search space in which case the size of CORESET 0 may be used if CORESET 0 is configured for the cell and the size of initial DL bandwidth part may be used if CORESET 0 is not configured for the cell.

In an example, when a UE is scheduled to transmit a transport block and no CSI report, or the UE is scheduled to transmit a transport block and a CSI report(s) on PUSCH by a DCI, the 'Time domain resource assignment' field value m of the DCI provides a row index m+1 to an allocated table. The indexed row may define the slot offset $K_2$, the start and length indicator SLIV, or directly the start symbol S and the allocation length L, the PUSCH mapping type, and the number of repetitions (if numberOfRepetitions is present in the resource allocation table) to be applied in the PUSCH transmission.

In an example, when the UE is scheduled to transmit a PUSCH with no transport block and with a CSI report(s) by a 'CSI request' field on a DCI, the 'Time domain resource assignment' field value m of the DCI may provide a row index m+1 to the allocated table. The indexed row may define the start and length indicator SLIV, or directly the start symbol S and the allocation length L, and the PUSCH mapping type to be applied in the PUSCH transmission and the $K_2$ value may be determined as $$K_2 = \max_j Y_j(m+1),$$

where $Y_j$, j=0, . . . , $N_{Rep}-1$ are the corresponding list entries of the higher layer parameter reportSlotOffsetListDCI-0-2, if PUSCH is scheduled by DCI format 0_2 and reportSlotOffsetListDCI-0-2 is configured; reportSlotOffsetListDCI-0-1, if PUSCH is scheduled by DCI format 0_1 and reportSlotOffsetListDCI-0-1 is configured; reportSlotOffsetList, otherwise; in CSI-ReportConfig for the $N_{Rep}$ triggered CSI Reporting Settings and $Y_j(m+1)$ is the (m+1)th entry of $Y_j$.

In an example, the slot $K_s$ where the UE may transmit the PUSCH may be determined by $K_2$ as $$K_s = \left\lfloor n \cdot \frac{2^{\mu_{PUSCH}}}{2^{\mu_{PDCCH}}} \right\rfloor + K_2 + \left\lfloor \left( \frac{N_{slot,offset,PDCCH}^{CA}}{2^{\mu_{offset,PDCCH}}} - \frac{N_{slot,offset,PUSCH}^{CA}}{2^{\mu_{offset,PUSCH}}} \right) \cdot 2^{\mu_{PUSCH}} \right\rfloor,$$

if UE is configured with ca-SlotOffset for at least one of the scheduled and scheduling cell, $$K_s = \left\lfloor n \cdot \frac{2^{\mu_{PUSCH}}}{2^{\mu_{PDCCH}}} \right\rfloor + K_2,$$

otherwise, and where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively.

$$N_{slot,offset,PDCCH}^{CA}$$

and $\mu_{offset,PDCCH}$ may be the $$N_{slot,offset}^{CA}$$

and the $\mu_{offset}$, respectively, which may be determined by higher-layer configured ca-SlotOffset for the cell receiving the PDCCH, $$N_{slot,offset,PUSCH}^{CA}$$

and $\mu_{offset,PUSCH}$ are the $$N_{slot,offset}^{CA}$$

and the $\mu_{offset}$, respectively, which may be determined by higher-layer configured ca-SlotOffset for the cell transmitting the PUSCH. For PUSCH scheduled by DCI format 0_1, if pusch-RepTypeIndicatorDCI-0-1 is set to 'pusch-RepTypeB', the UE may apply PUSCH repetition Type B procedure when determining the time domain resource allocation. For PUSCH scheduled by DCI format 0_2, if pusch-RepTypeIndicatorDCI-0-2 is set to 'pusch-RepTypeB', the UE may apply PUSCH repetition Type B procedure when determining the time domain resource allocation. Otherwise, the UE may apply PUSCH repetition Type A procedure when determining the time domain resource allocation for PUSCH scheduled by PDCCH. For PUSCH repetition Type A, the starting symbol S relative to the start of the slot, and the number of consecutive symbols L counting from the symbol S allocated for the PUSCH may be determined from the start and length indicator SLIV of the indexed row:

```
if (L − 1) ≤ 7 then
   SLIV = 14 · (L − 1) + S
else
   SLIV = 14 · (14 − L + 1) + (14 − 1 − S)
where0 < L ≤ 14 − S, and
```

For PUSCH repetition Type B, the starting symbol S relative to the start of the slot, and the number of consecutive symbols L counting from the symbol S allocated for the PUSCH may be provided by startSymbol and length of the indexed row of the resource allocation table, respectively.

For PUSCH repetition Type A, the PUSCH mapping type may be set to Type A or Type B as given by the indexed row.

For PUSCH repetition Type B, the PUSCH mapping type is set to Type B.

In an example, for PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions is present in the resource allocation table, the number of repetitions K is equal to numberOfRepetitions; else if the UE is configured with pusch-AggregationFactor, the number of repetitions K is equal to pusch-AggregationFactor; otherwise K=1.

In an example, if a UE is configured with higher layer parameter pusch-TimeDomainAllocationListForMulti-PUSCH, the UE may not expect to be configured with pusch-AggregationFactor.

In an example, for PUSCH repetition Type A, in case K>1, the same symbol allocation may be applied across the K consecutive slots and the PUSCH may be limited to a single transmission layer. The UE may repeat the TB across the K consecutive slots applying the same symbol allocation in each slot. The redundancy version to be applied on the nth transmission occasion of the TB, where n=0, 1, . . . K−1, is determined according to a table.

In an example, when transmitting MsgA PUSCH on a non-initial UL BWP, if the UE is configured with startSymbolAndLengthMsgA-PO, the UE may determine the S and L from startSymbolAndLengthMsgA-PO.

In an example, when transmitting MsgA PUSCH, if the UE is not configured with startSymbolAndLengthMsgA-PO, and if the TDRA list PUSCH-TimeDomainResourceAllocationList is provided in PUSCH-ConfigCommon, the UE may use msgA-PUSCH-TimeDomainAllocation to indicate which values are used in the list. If PUSCH-TimeDomainResourceAllocationList is not provided in PUSCH-ConfigCommon, the UE may use parameters S and L from one or more tables.

In an example, for PUSCH repetition Type B, except for PUSCH transmitting CSI report(s) with no transport block, the number of nominal repetitions may be given by numberOfRepetitions. For the n-th nominal repetition, n=0, . . . , numberOfRepetitions−1, the slot where the nominal repetition starts is given by $$K_s + \left\lfloor \frac{S + n \cdot L}{N_{symb}^{slot}} \right\rfloor,$$

and the starting symbol relative to the start of the slot is given by $$\text{given by } \mathrm{mod}\left(S + n \cdot L,\ N_{symb}^{slot}\right).$$

The slot where the nominal repetition ends may be given by $$K_s + \left\lfloor \frac{S + (n+1) \cdot L - 1}{N_{symb}^{slot}} \right\rfloor,$$

and the ending symbol relative to the start of the slot may be given by $$\mathrm{mod}\left(S + (n+1) \cdot L - 1,\ N_{symb}^{slot}\right).$$

In an example, the PDSCH-Config IE may be used to configure the UE specific PDSCH parameters. A parameter pdsch-AggregationFactor may indicate a number of repetitions for data. When the field is absent the UE may apply the value 1.

In an example, the IE SPS-Config may be used to configure downlink semi-persistent transmission. Multiple Downlink SPS configurations may be configured in one BWP of a serving cell. A parameter pdsch-AggregationFactor may indicate a number of repetitions for SPS PDSCH. When the field is absent, the UE may apply PDSCH aggregation factor of PDSCH-Config.

In an example, an IE PUSCH-Config may be used to configure the UE specific PUSCH parameters applicable to a particular BWP. A parameter pusch-AggregationFactor may indicate a number of repetitions for data. If the field is absent the UE may apply the value 1.

In an example, the IE PDSCH-TimeDomainResourceAllocation may be used to configure a time domain relation between PDCCH and PDSCH. The PDSCH-TimeDomainResourceAllocationList may contain one or more of such PDSCH-TimeDomainResourceAllocations. The network may indicate in the DL assignment which of the configured time domain allocations the UE may apply for that DL assignment. The UE may determine the bit width of the DCI field based on the number of entries in the PDSCH-TimeDomainResourceAllocationList. Value 0 in the DCI field may refer to the first element in this list, value 1 in the DCI field may refer to the second element in this list, and so on. A parameter k0 may indicate slot offset between DCI and its scheduled PDSCH. When the field is absent the UE may apply the value 0. A parameter mappingType may indicate a PDSCH mapping type. A parameter repetitionNumber may indicate the number of PDSCH transmission occasions for slot-based repetition scheme in IE RepetitionSchemeConfig. A parameter startSymbolAndLength may indicate an index giving valid combinations of start symbol and length (jointly encoded) as start and length indicator (SLIV). The network may configure the field so that the allocation does not cross the slot boundary.

In an example, the IE RepetitionSchemeConfig may be used to configure the UE with repetition schemes. A parameter fdm-TDM may configures UE with a repetition scheme among fdmSchemeA, fdmSchemeB and tdmSchemeA. A parameter sequenceOffsetForRV, for slot-based repetition scheme, selected RV sequence may be applied to transmission occasions associated to the first TCI state. The RV sequence associated to the second TCI state may be determined by a RV offset from that selected RV sequence. A parameter slotBased may configure UE with slot-based repetition scheme. Network may configure this field when the parameter repetitionNumber is present in IE PDSCH-TimeDomainResourceAllocationList. A parameter startingSymbolOffsetK may indicate the starting symbol of the second transmission occasion has K symbol offset relative to the last symbol of the first transmission occasion. When UE is configured with tdmSchemeA, the parameter startingSymbolOffsetK may be present, otherwise absent. A parameter tciMapping may enable TCI state mapping method to PDSCH transmission occasions.

In an example, an IE PUSCH-TimeDomainResourceAllocation may be used to configure a time domain relation between PDCCH and PUSCH. PUSCH-TimeDomainResourceAllocationList may contain one or more of such PUSCH-TimeDomainResourceAllocations. The network may indicate in the UL grant which of the configured time domain allocations the UE may apply for that UL grant. The UE may determine the bit width of the DCI field based on the number of entries in the PUSCH-TimeDomainResourceAllocationList. Value 0 in the DCI field may refer to the first element in this list, value 1 in the DCI field refers to the second element in this list, and so on. A parameter k2 may correspond to L1 parameter 'K2'. When the field is absent the UE may apply the value 1 when PUSCH SCS is 15/30 kHz; the value 2 when PUSCH SCS is 60 kHz, and the value 3 when PUSCH SCS is 120 KHz. A parameter length may indicate the length allocated for PUSCH for DCI format 0_1/0_2. A parameter mappingType may indicate mapping type. A parameter numberOfRepetitions may indicate a number of repetitions for DCI format 0_1/0_2. A parameter puschAllocationList may indicate one or multiple PUSCH continuous in time domain which may share a common k2. This list may have one element in pusch-TimeDomainAllocationListDCI-0-1-r16 and in pusch-TimeDomainAllocationListDCI-0-2-r16. A parameter startSymbol may indicate the index of start symbol for PUSCH for DCI format 0_1/0_2. A parameter startSymbolAndLength may indicate an index giving valid combinations of start symbol and length (jointly encoded) as start and length indicator (SLIV). The network may configure the field so that the allocation does not cross the slot boundary.

In an example, a UE may be configured to receive code block group-based transmissions by receiving the higher layer parameter codeBlockGroupTransmission for PDSCH.

In an example, the 'CBG transmission information' (CBGTI) field of DCI format 1_1 may be of length $N_{TB}$·N bits, where $N_{TB}$ may be the value of the higher layer parameter maxNrofCodeWordsScheduledByDCI. If $N_{TB}$=2 the CBGTI field bits may be mapped such that the first set of N bits starting from the MSB corresponds to the first TB while the second set of N bits may correspond to a second TB, if scheduled. The first M bits of each set of N bits in the CBGTI field may have an in-order one-to-one mapping with the M CBGs of the TB, with the MSB mapped to CBG #0. For initial transmission of a TB as indicated by the 'New Data Indicator' field of the scheduling DCI, the UE may assume that the code block groups of the TB are present. For a retransmission of a TB as indicated by the 'New Data Indicator' field of the scheduling DCI, the UE may assume that the 'CBGTI' field of the scheduling DCI indicates which CBGs of the TB are present in the transmission. A bit value of '0' in the CBGTI field may indicate that the corresponding CBG is not transmitted and '1' may indicate that it is transmitted. If the 'CBG flushing out information' (CBGFI) field of the scheduling DCI is present, 'CBGFI' set to '0' may indicate that the earlier received instances of the same CBGs being transmitted may be corrupted, and 'CBGFI' set to '1' may indicate that the CBGs being retransmitted are combinable with the earlier received instances of the same CBGs. A CBG may contain the same CBs as in the initial transmission of the TB.

In an example, if a UE is configured to transmit code block group (CBG) based transmissions by receiving the higher layer parameter codeBlockGroupTransmission in PUSCH-ServingCellConfig, the UE may determine the number of CBGs for a PUSCH transmission as M=min(N, C), where N is the maximum number of CBGs per transport block as configured by maxCodeBlockGroupsPerTransportBlock in PUSCH-ServingCellConfig, and C is the number of code blocks in the PUSCH.

In an example, $$M_1 = \mathrm{mod}(C, M),\ K_1 = \left\lceil \frac{C}{M} \right\rceil,\ \text{and}\ K_2 = \left\lfloor \frac{C}{M} \right\rfloor.$$

If $M_1>0$, CBG m, m=0,1, . . . , $M_1-1$, may consist of code blocks with indices $m\cdot K_1+k$, k=0,1, . . . , $K_1-1$. CBG m, m=$M_1$, $M_1+1$, . . . , M−1, may consist of code blocks with indices $M_1\cdot K_1+(m-M_1)\cdot K_2+k$, k=0,1, . . . , $K_2-1$.

In an example, if a UE is configured to transmit code block group-based transmissions by receiving the higher layer parameter codeBlockGroupTransmission in PUSCH-ServingCellConfig, for an initial transmission of a TB as indicated by the 'New Data Indicator' field of the scheduling DCI, the UE may expect that the CBGTI field indicates the CBGs of the TB are to be transmitted, and the UE may include the code block groups of the TB. For a retransmission of a TB as indicated by the 'New Data Indicator' field of the scheduling DCI, the UE may include only the CBGs indicated by the CBGTI field of the scheduling DCI.

A bit value of '0' in the CBGTI field may indicate that the corresponding CBG is not to be transmitted and '1' may indicate that it is to be transmitted. The order of CBGTI field bits may be such that the CBGs are mapped in order from CBG #0 onwards starting from the MSB.

In an example, a DCI format 0_1 may be used for the scheduling of one or multiple PUSCH in one cell. In an example, a CBG transmission information (CBGTI) field may include 0 bit if higher layer parameter codeBlockGroupTransmission for PUSCH is not configured or if the number of scheduled PUSCH indicated by the Time domain resource assignment field is larger than 1; otherwise, the field may include 2, 4, 6, or 8 bits determined by higher layer parameter maxCodeBlockGroupsPerTransportBlock for PUSCH.

In an example, a DCI format 1_1 may be used for the scheduling of PDSCH in one cell. In an example, a CBG transmission information (CBGTI) field may include 0 bit if higher layer parameter codeBlockGroupTransmission for PDSCH is not configured, otherwise, the field may include 2, 4, 6, or 8 bits, determined by the higher layer parameters maxCodeBlockGroupsPerTransportBlock and maxNrofCodeWordsScheduledByDCI for the PDSCH.

In an example, a CBG flushing out information (CBGFI) field may include 1 bit if higher layer parameter codeBlockGroupFlushIndicator is configured as "TRUE" and may include 0 bit otherwise. If higher layer parameter priorityIndicatorDCI-1-1 is configured, if the bit width of the CBG flushing out information in DCI format 1_1 for one HARQ-ACK codebook is not equal to that of the CBG flushing out information in DCI format 1_1 for the other HARQ-ACK codebook, a number of most significant bits with value set to '0' are inserted to smaller CBG flushing out information until the bit width of the CBG flushing out information in DCI format 1_1 for the two HARQ-ACK codebooks may be the same.

Figure 16:
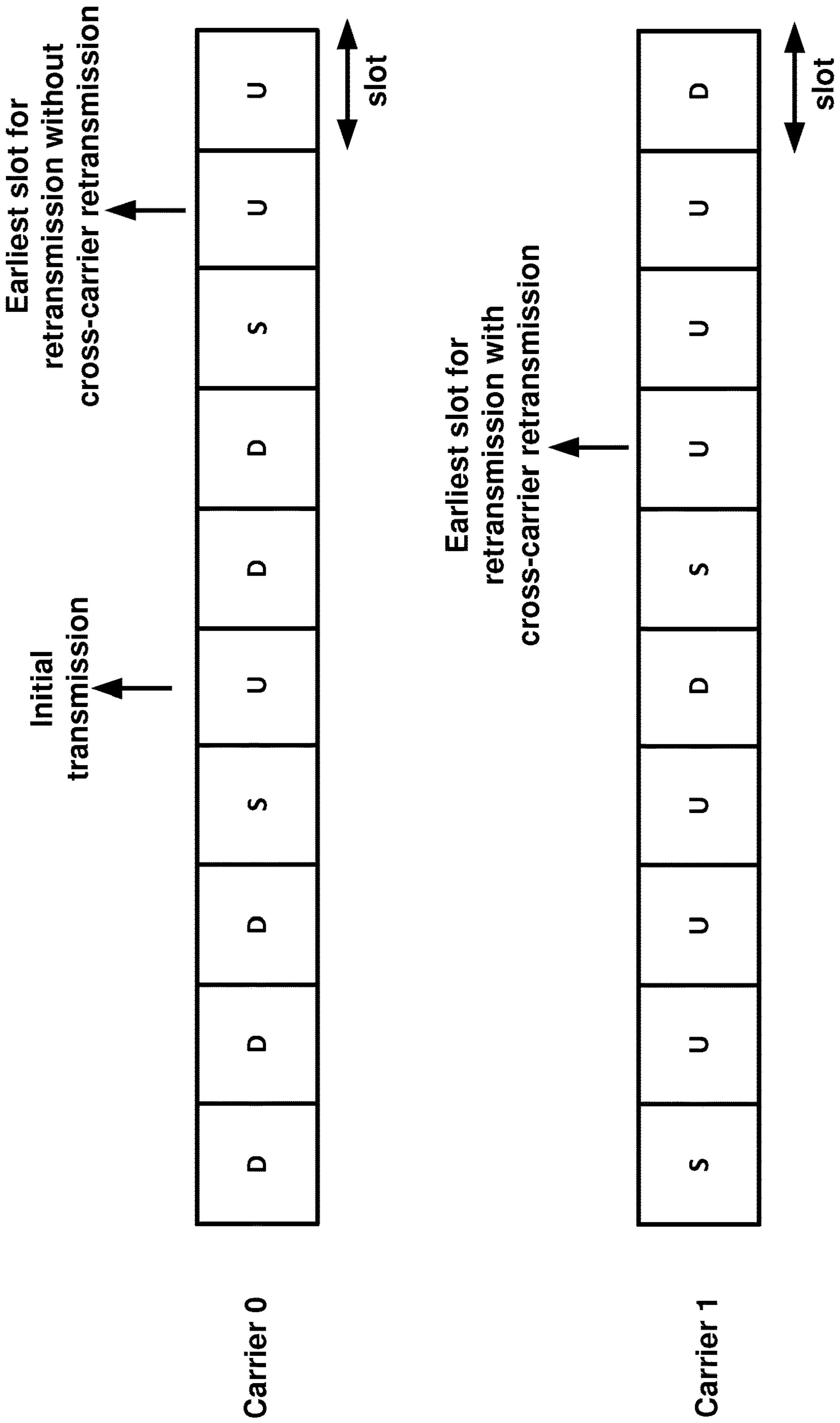
FIG. 16 shows an example scenario with single-carrier and cross-carrier retransmission in accordance with several of various embodiments of the present disclosure.
Figure 17:
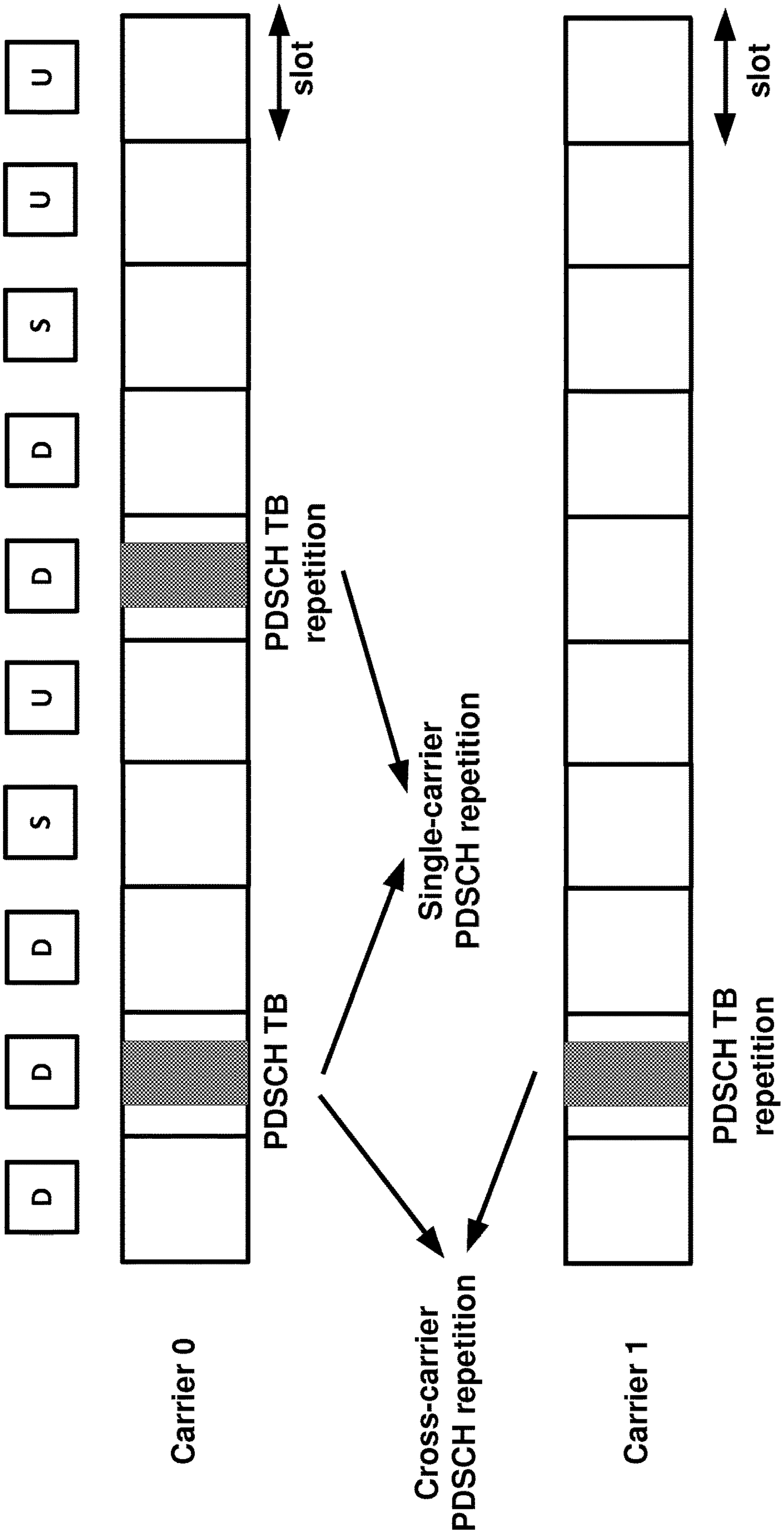
FIG. 17 shown an example scenario with single-carrier and cross-carrier repetition in accordance with several of various embodiments of the present disclosure.

In certain applications or service types (e.g., ultra-reliable low-latency communications (URLLC) application/service type, internet of things (IoT), industrial IoT (IIoT), etc.), providing low-latency (e.g., sub-millisecond) latency may be of great importance. Furthermore, HARQ retransmission of transport blocks or repetitions of a transport block may be important to achieve reliability. With existing retransmission or repetition processes and as shown in FIG. 16 and FIG. 17, the low-latency requirements for such applications or service types may not be achievable. Example embodiments enhance the existing retransmission or repetition processes to enable the low-latency requirements while the reliability requirements via retransmission or repetition is achieved. For example, as shown in FIG. 16 and in a TDD scenario, with existing retransmission mechanisms, retransmission of a transport block via a carrier may lead to multiple slots of latency and may not meet the low-latency requirements for certain applications/service types. Example embodiments may enable cross-carrier retransmission resulting in a bounded latency and/or meeting the low-latency requirements. For example, as shown in FIG. 17 and in a TDD scenario, single-carrier repetitions of transport blocks may result in increased latency or may not achieve sufficient frequency diversity. Example embodiments may enable cross-carrier repetitions resulting in a bounded latency and/or meeting the low-latency and/or reliability requirements.

In example embodiments, a wireless device may receive one or more messages comprising configuration parameters. The one or more messages may comprise one or more RRC messages. The configuration parameters may comprise configuration parameters of a plurality of cells. The plurality of cells may comprise a first cell and a second cell. In an example, at least one of the first cell and the second cell may be a TDD cell associated with corresponding TDD configuration. In an example, the plurality of cells may be provided by one base station. In an example, the plurality of cells may comprise a plurality of cell groups. In an example, the plurality of cells may comprise first plurality of cells (e.g., a master cell group (MCG)) provided by a master base station and second plurality of cells (e.g., a secondary cell group (SCG)) provided by a secondary base station. In an example, the first cell and the second may belong to the same cell group (e.g., the MCG or the SCG).

In example embodiments, a DCI comprising a grant (uplink grant or downlink assignment) for retransmission of a transport block via a second cell may indicate that an initial transmission of the transport block took place via a first cell or may indicate that the initial transmission of the transport block took place via a cell different from the first cell. In an example, the grant may further indicate a first HARQ process number used for the initial transmission of the transport block via the first cell. In an example, the HARQ process number associated with the retransmission of the transport block via the second cell may be the same as the HARQ process number associated with the initial transmission of the transport block via the first cell. In an example, the DCI may indicate the HARQ process number associated with the retransmission of the transport block or may indicate the HARQ process number associated with the initial transmission of the transport block. In an example, the wireless device may determine the HARQ process number associated with the retransmission of the transport block via the second cell based on the HARQ process number associated with the initial transmission of the transport block via the first cell. In an example, the wireless device may determine the HARQ process number associated with the retransmission of the transport block via the second cell based on the HARQ process number associated with the initial transmission of the transport block via the first cell and based on a configuration parameter (e.g., an RRC configurable parameter e.g., an RRC configurable offset). In an example, the wireless device may determine the HARQ process number associated with the initial transmission of the transport block via the first cell based on the HARQ process number associated with the retransmission of the transport block via the second cell. In an example, the wireless device may determine the HARQ process number associated with the initial transmission of the transport block via the first cell based on the HARQ process number associated with the retransmission of the transport block via the second cell and based on a configuration parameter (e.g., an RRC configurable parameter e.g., an RRC configurable offset).

Figure 18:
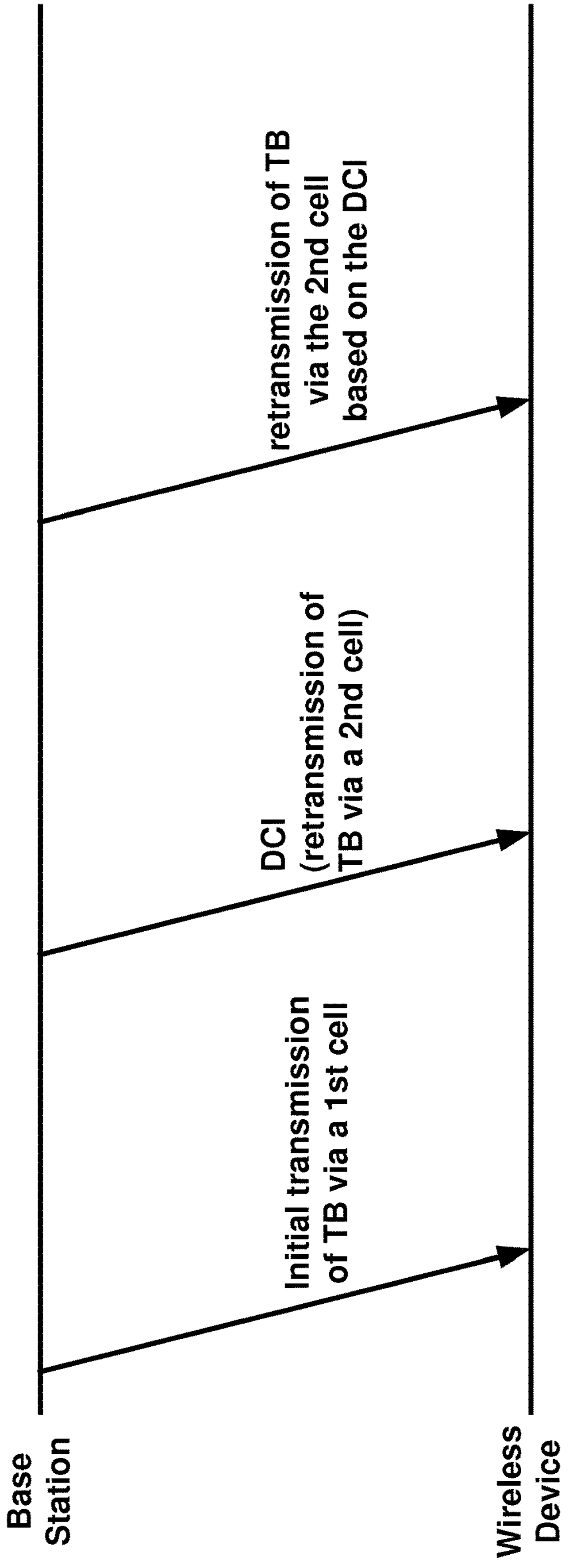
FIG. 18 shows an example process in accordance with several of various embodiments of the present disclosure.

In an example embodiment as shown in FIG. 18, a wireless device may receive an initial transmission of a first transport block via a first cell. The wireless device may receive the initial transmission of the first transport block via a PDSCH. The wireless device may receive the initial transmission of the first transport block via the PDSCH in response to receiving a first DCI comprising first scheduling information (e.g., a first downlink assignment) and based on the first scheduling information (e.g., the first downlink assignment). The wireless device may receive a second DCI indicating retransmission of the first transport block via a second cell. In an example, the second DCI may comprise second scheduling information (e.g., a second downlink assignment) for retransmission of the second transport block. The wireless device may receive the second DCI comprising the second scheduling information for retransmission of the first transport block wherein the initial transmission of the first transport block was via the first cell. The wireless device may receive the retransmission of the first transport block via the second cell. The wireless device may receive the retransmission of the first transport block via a PDSCH. The wireless device may receive the retransmission of the first transport block via the PDSCH in response to receiving the second DCI and based on the second scheduling information.

Figure 19:
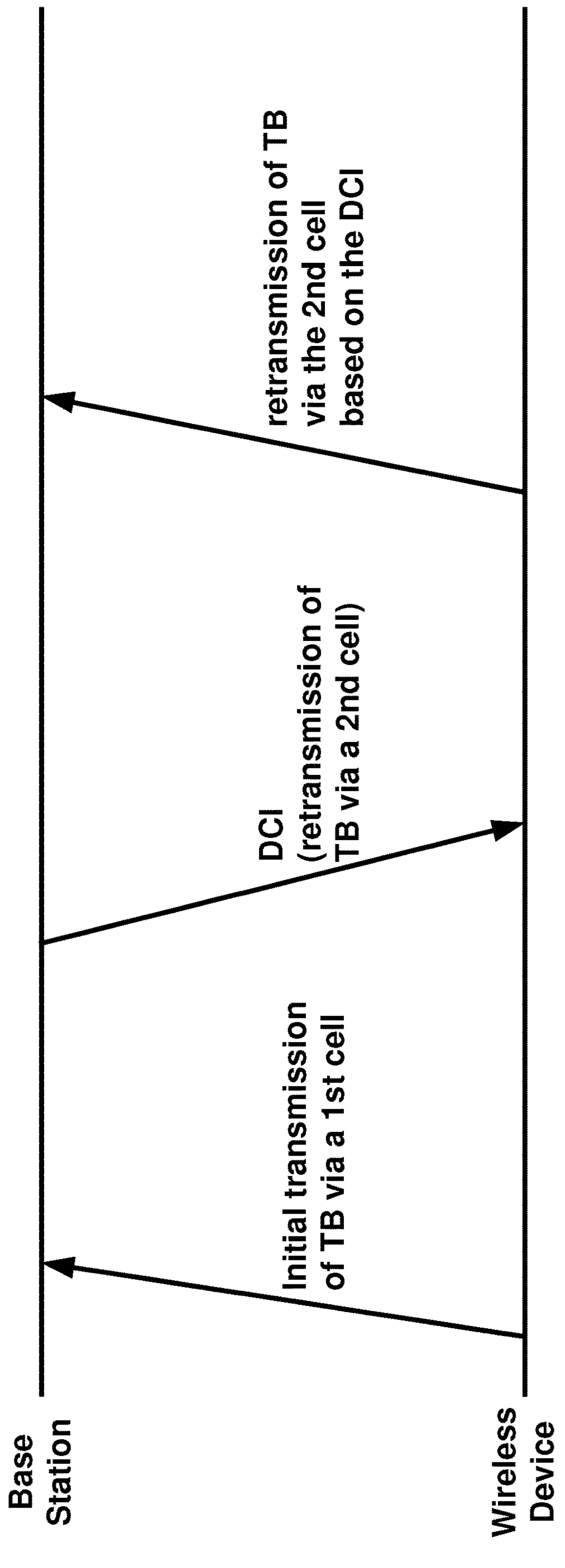
FIG. 19 shows an example process in accordance with several of various embodiments of the present disclosure.

In an example embodiment as shown in FIG. 19, a wireless device may transmit an initial transmission of a first transport block via a first cell. The wireless device may transmit the initial transmission of the first transport block via a PUSCH. The wireless device may transmit the initial transmission of the first transport block via the PUSCH in response to receiving a first DCI comprising first scheduling information (e.g., a first uplink grant) and based on the first scheduling information (e.g., the first uplink grant). The wireless device may receive a second DCI indicating retransmission of the first transport block via a second cell. In an example, the second DCI may comprise second scheduling information (e.g., a second uplink grant) for retransmission of the first transport block. The wireless device may receive the second DCI comprising the second scheduling information for retransmission of the first transport block wherein the initial transmission of the first transport block was via the first cell. The wireless device may transmit the retransmission of the first transport block via the second cell. The wireless device may transmit the retransmission of the first transport block via a PUSCH. The wireless device may transmit the retransmission of the first transport block via the PUSCH in response to receiving the second DCI and based on the second scheduling information.

In an example, the second DCI may indicate retransmission of one or more code block groups (CBGs) of the first transport block. For example, the second DCI may comprise a CBGTI field comprising a plurality of bits that are associated with a plurality of CBGs. A value of a bit in the plurality of bits may indicate whether the second DCI indicates retransmission of the corresponding CBG. The first transport block may comprise a plurality of CBGs. The CBGTI field may indicate retransmission of one or more CBGs of the plurality of CBGs. For example, the second DCI may comprise a CBGFI field comprising a plurality of bits that are associated with a plurality of CBGs. A value of a bit in the plurality of bits may indicate whether the corresponding CBG is corrupted or combinable with the earlier version of the earlier received instances in decoding the CBG/transport block.

The first cell (e.g., a first BWP or an active BWP of the first cell) may be associated with a first subcarrier spacing/numerology. The second cell (e.g., a second BWP or an active BWP of the second cell) may be associated with a second subcarrier spacing/numerology. In an example, the first subcarrier spacing/numerology and the second subcarrier spacing/numerology may be the same. In an example, there may be an association between the first subcarrier spacing/numerology and the second subcarrier spacing/numerology and/or there may be association between the first cell/active BWP of the first cell and the second cell/active BWP of the second cell. In an example, the association may be pre-configured. In an example, the association may be configurable, and the wireless device may receive a configuration parameter indicating the association.

The second DCI may indicate (e.g., based on a format of the second DCI and/or based on an RNTI associated with the second DCI and/or based on a value of a field of the second DCI) that the initial transmission of the first transport block was via the first cell or that the initial transmission of the first transport block was via a cell different from the second cell (the cell on which the retransmission of the first transport block is scheduled by the second DCI). In an example, the second DCI may indicate one or more parameters associated with the initial transmission of the first transport block via the first cell. In an example, the wireless device may determine that the initial transmission of the first transport block was via the first cell or via a cell different from the second cell (the cell on which the retransmission of the first transport block is scheduled by the second DCI) based on the second DCI (e.g., based on a format of the second DCI and/or based on an RNTI associated with the second DCI and/or based on a value of a field of the second DCI) and/or based on the one or more parameters. The second DCI may indicate values of one or more parameters associated with the initial transmission of the first transport block via the first cell. In an example, the wireless device may determine a second value of a parameter associated with the retransmission of the first transport block based on a first value of the parameter associated with the initial transmission of the first transport block.

In an example, the second DCI may comprise a first field with a value indicating the first cell, for example, a first identifier/index of the first cell (the first cell on which the initial transmission of the first transport block is transmitted). The wireless device may determine the second cell, for example a second identifier/index of the second cell (the second cell on which the retransmission of the first transport block is scheduled for transmission) based on the first cell, for example based on the first identifier/index. In an example, the wireless device may determine the second cell (e.g., the second identifier/index of the second cell) further based on a configuration parameter (e.g., an RRC configuration parameter received via an RRC message). For example, the configuration parameter may indicate an offset (e.g., an offset to the first identifier/index). The wireless device may determine the second identifier/index of the second cell based on the first identifier/index of the first cell and the offset indicated by the configuration parameter. For example, the configuration parameter may indicate an association between the first cell (e.g., the first identifier/index of the first cell) and the second cell (e.g., the second identifier/index of the second cell). The wireless device may determine the second cell (e.g., the second identifier/index of the second cell) based on the first cell (e.g., the first identifier/index of the first cell) and the association indicated by the configuration parameter.

In an example, the wireless device may determine the second cell (e.g., the second identifier/index of the second cell) further based on a pre-configured parameter. For example, the pre-configured parameter may indicate an offset (e.g., an offset to the first identifier/index). The wireless device may determine the second identifier/index of the second cell based on the first identifier/index of the first cell and the offset indicated by the pre-configured parameter.

In an example, the second DCI may comprise a second field with a value indicating the second cell, for example, a second identifier/index of the second cell (the second cell on which the retransmission of the first transport block is scheduled for transmission). The wireless device may determine the first cell, for example a first identifier/index of the first cell (the first cell on which the initial transmission of the first transport block is transmitted) based on the second cell, for example based on the second identifier/index. In an example, the wireless device may determine the first cell (e.g., the first identifier/index of the first cell) further based on a configuration parameter (e.g., an RRC configuration parameter received via an RRC message). For example, the configuration parameter may indicate an offset (e.g., an offset to the second identifier/index). The wireless device may determine the first identifier/index of the first cell based on the second identifier/index of the second cell and the offset indicated by the configuration parameter. For example, the configuration parameter may indicate an association between the second cell (e.g., the second identifier/ index of the second cell) and the first cell (e.g., the first identifier/index of the first cell). The wireless device may determine the first cell (e.g., the first identifier/index of the first cell) based on the second cell (e.g., the second identifier/index of the second cell) and the association indicated by the configuration parameter.

In an example, the wireless device may determine the first cell (e.g., the first identifier/index of the first cell) further based on a pre-configured parameter. For example, the pre-configured parameter may indicate an offset (e.g., an offset to the second identifier/index). The wireless device may determine the first identifier/index of the first cell based on the second identifier/index of the second cell and the offset indicated by the pre-configured parameter.

In an example, the second DCI may indicate that the initial transmission of the first transport block, via the first cell, was associated with a first HARQ process number. For example, the second DCI may comprise a field, a value of the field indicating that the initial transmission of the first transport block, via the first cell, was associated with the first HARQ process number. In an example, a second HARQ process number, associated with the retransmission of the first transport block via the second cell may be the same as the first HARQ process number used in the initial transmission of the first transport block. In an example, the wireless device may determine the second HARQ process number used in retransmission of the first transport block via the second cell based on the first HARQ process number used in the initial transmission of the first transport block via the first cell. In an example, the wireless device may determine the second HARQ process number further based on a configuration parameter (e.g., an RRC configuration parameter received via an RRC message). For example, the configuration parameter may indicate an offset (e.g., an offset to the first HARQ process number). The wireless device may determine the second HARQ process number based on the first HARQ number and the offset indicated by the configuration parameter. For example, the configuration parameter may indicate an association between the first HARQ process number and the second HARQ process number. The wireless device may determine the second HARQ process number based on the first HARQ process number and the association indicated by the configuration parameter.

In an example, the wireless device may determine the second HARQ process number further based on a pre-configured parameter. For example, the pre-configured parameter may indicate an offset (e.g., an offset to the first HARQ process number). The wireless device may determine the second HARQ process number based on the first HARQ number and the offset indicated by the pre-configured parameter.

In an example, the second DCI may indicate that the retransmission of the first transport block, scheduled for transmission via the second cell, is associated with a second HARQ process number. For example, the second DCI may comprise a field, a value of the field indicating that the retransmission of the first transport block, scheduled for transmission via the second cell, is associated with the second HARQ process number. In an example, a first HARQ process number, associated with the initial transmission of the first transport block via the first cell may be the same as the second HARQ process number used in retransmission of the first transport block via the second cell. In an example, the wireless device may determine the first HARQ process number used in the initial transmission of the first transport block via the first cell based on the second HARQ process number for the scheduled retransmission of the first transport block via the second cell. In an example, the wireless device may determine the first HARQ process number further based on a configuration parameter (e.g., an RRC configuration parameter received via an RRC message). For example, the configuration parameter may indicate an offset (e.g., an offset to the first HARQ process number). The wireless device may determine the first HARQ process number based on the second HARQ number and the offset indicated by the configuration parameter. For example, the configuration parameter may indicate an association between the first HARQ process number and the second HARQ process number. The wireless device may determine the first HARQ process number based on the second HARQ process number and the association indicated by the configuration parameter.

In an example, the wireless device may determine the first HARQ process number further based on a pre-configured parameter. For example, the pre-configured parameter may indicate an offset (e.g., an offset to the second HARQ process number). The wireless device may determine the first HARQ process number based on the second HARQ number and the offset indicated by the pre-configured parameter.

In an example, the initial transmission of the first transport block, via the first cell, may be associate with a first redundancy version (RV). The retransmission of the first transport block, via the second cell, may be associated with a second RV.

In an example, the second DCI may indicate that the initial transmission of the first transport block, via the first cell, was associated with the first RV. For example, the second DCI may comprise an RV field, a value of the RV field indicating that the initial transmission of the first transport block, via the first cell, was associated with the first RV. In an example, the wireless device may determine the second RV used in retransmission of the first transport block via the second cell based on the first RV used in the initial transmission of the first transport block via the first cell. In an example, the wireless device may determine the second RV further based on a configuration parameter (e.g., an RRC configuration parameter received via an RRC message). For example, the configuration parameter may indicate an offset (e.g., an offset to the first RV). The wireless device may determine the second RV based on the first RV and the offset indicated by the configuration parameter. For example, the configuration parameter may indicate an association between the first RV and the second RV. The wireless device may determine the second RV based on the first RV and the association indicated by the configuration parameter.

In an example, the wireless device may determine the second RV further based on a pre-configured parameter. For example, the pre-configured parameter may indicate an offset (e.g., an offset to the first RV). The wireless device may determine the second RV based on the first RV and the offset indicated by the pre-configured parameter. For example, the pre-configured parameter may indicate an association between the first RV and the second RV. The wireless device may determine the second RV based on the first RV and the association indicated by the pre-configured parameter.

In an example, the second DCI may indicate that the scheduled retransmission of the first transport block, via the second cell, is associated with the second RV. For example, the second DCI may comprise an RV field, a value of the RV field indicating that the scheduled retransmission of the first transport block, via the second cell, is associated with the second RV. In an example, the wireless device may determine the first RV used in the initial transmission of the first transport block via the first cell based on the second RV indicated by the second DCI for the scheduled retransmission of the first transport block via the second cell. In an example, the wireless device may determine the first RV further based on a configuration parameter (e.g., an RRC configuration parameter received via an RRC message). For example, the configuration parameter may indicate an offset (e.g., an offset to the first RV). The wireless device may determine the first RV based on the second RV and the offset indicated by the configuration parameter. For example, the configuration parameter may indicate an association between the first RV and the second RV. The wireless device may determine the first RV based on the second RV and the association indicated by the configuration parameter.

In an example, the wireless device may determine the first RV further based on a pre-configured parameter. For example, the pre-configured parameter may indicate an offset (e.g., an offset to the second RV). The wireless device may determine the first RV based on the second RV and the offset indicated by the pre-configured parameter. For example, the pre-configured parameter may indicate an association between the first RV and the second RV. The wireless device may determine the first RV based on the second RV and the association indicated by the pre-configured parameter.

In an example, at least one of the first DCI and the second DCI may be associated with a first format. A DCI with the first format may be used in scheduling transmission or retransmission of a transport block via a plurality of cells. A DCI with the first format may be used in scheduling retransmissions of a transport block via a cell different from the cell that the initial transmission of the transport block is transmitted or received. A first format of the DCI may indicate that the DCI is used in scheduling transmission or retransmission of a transport block via a plurality of cells or may indicate that the DCI is used in scheduling retransmissions of a transport block via a cell different from the cell that the initial transmission of the transport block is transmitted or received. The wireless device may determine, based on the format of the received DCI, that the DCI may be used in scheduling transmission or retransmission of a transport block via a plurality of cells. The wireless device may determine, based on the format of the received DCI, that the DCI may be used in scheduling retransmissions of a transport block via a cell different from the cell that the initial transmission of the transport block is transmitted or received.

In an example, at least one of the first DCI and the second DCI may be associated with a first RNTI. At least one of the first CRC of the first DCI and the second CRC of the second DCI may be scrambled with the first RNTI. A DCI associated with the first RNTI may be used in scheduling transmission or retransmission of a transport block via a plurality of cells. A DCI associated with the first RNTI may be used in scheduling retransmissions of a transport block via a cell different from the cell that the initial transmission of the transport block is transmitted or received. A first RNTI associated with the DCI may indicate that the DCI is used in scheduling transmission or retransmission of a transport block via a plurality of cells or may indicate that the DCI is used in scheduling retransmissions of a transport block via a cell different from the cell that the initial transmission of the transport block is transmitted or received. The wireless device may determine, based on the RNTI associated with the received DCI, that the DCI may be used in scheduling transmission or retransmission of a transport block via a plurality of cells. The wireless device may determine, based on the RNTI associated with the received DCI, that the DCI may be used in scheduling retransmissions of a transport block via a cell different from the cell that the initial transmission of the transport block is transmitted or received.

In an example, at least one of the first DCI and the second DCI may comprise a field with a first value. In an example, at least a field of one of the first DCI and the second DCI may have a first value. A DCI with a field having the first value may be used in scheduling transmission or retransmission of a transport block via a plurality of cells. A DCI with a field having the first value may be used in scheduling retransmissions of a transport block via a cell different from the cell that the initial transmission of the transport block is transmitted or received. In an example, the field may be associate with a parameter (e.g., a transmission parameter). A value of the transmission parameter may be the same as value of the transmission parameter used in the initial transmission of the transport block and the field may be reused for indication of whether the DCI is used in scheduling transmission or retransmission of a transport block via a plurality of cells or may be reused for indication of whether the DCI is used in scheduling retransmissions of a transport block via a cell different from the cell that the initial transmission of the transport block is transmitted or received. The field may be a resource assignment field (e.g., time domain resource assignment or frequency domain resource assignment), a new data indicator field, a HARQ process number field, a redundancy version field, a transmission configuration indicator field, or other field. A first value of the field of the DCI may indicate that the DCI is used in scheduling transmission or retransmission of a transport block via a plurality of cells or may indicate that the DCI is used in scheduling retransmissions of a transport block via a cell different from the cell that the initial transmission of the transport block is transmitted or received. The wireless device may determine, based on the value of the field of the received DCI, that the DCI may be used in scheduling transmission or retransmission of a transport block via a plurality of cells. The wireless device may determine, based on the value of the field of the received DCI, that the DCI may be used in scheduling retransmissions of a transport block via a cell different from the cell that the initial transmission of the transport block is transmitted or received.

In an example, the second DCI may comprise a field (e.g., a HARQ process number field) comprising a value indicating a first HARQ process number. The first HARQ process number may be one of one or more first HARQ processes. The one or more first HARQ processes may be used in case retransmission of a transport block takes place via a cell different from the cell that the initial transmission of the transport block takes place. The one or more first HARQ processes may be associated with transmission or retransmission of the transport block via a plurality of cells, e.g., comprising the first cell and the second cell. Based on the HARQ process, indicated by the second DCI being one of the one or more first HARQ processes, the wireless device may determine that the first transport block, scheduled by the second DCI, is retransmission of the first transport that was initially transmitted via a cell different from the second cell.

In an example, the one or more first HARQ processes may be pre-configured. In an example, the one or more first HARQ processes may be configurable (e.g., RRC configurable). For example, the wireless device may receive one or more configuration parameters e.g., may receive one or more RRC messages comprising the one or more configuration parameters, indicating the one or more first HARQ processes.

In example embodiments, one or more HARQ processes may be associated with transmission or retransmission of a transport block via a plurality of cells. In example embodiments, the one or more HARQ processes may be usable for retransmission via cell(s) different from a cell that the initial transmission of the transport block took place.

In an example embodiment, a wireless device may receive a first DCI comprising first scheduling information (e.g., a first downlink assignment or a first uplink grant) for transmission of a first transport block via a first cell. The DCI may comprise a first field (e.g., a first HARQ process number field) indicating a first HARQ process number associated with the first transport block. The first HARQ process number may be one of one or more first HARQ processes. The one or more first HARQ processes may be associated with transmission or retransmission of a transport block via a plurality of cells. The one or more first HARQ processes may be associated with retransmission of a transport block via a cell that is different from a cell that is used for initial transmission of the transport block. In an example, the one or more first HARQ processes may be pre-configured. In an example, the one or more first HARQ processes may be configurable (e.g., RRC configurable). For example, the wireless device may receive one or more messages (e.g., one or more RRC messages) comprising one or more configuration parameters indicating the one or more first HARQ processes. In response to receiving the first DCI and based on the first scheduling information, the wireless device may transmit or receive the first transport block via the first cell. The wireless device may receive a second DCI comprising second scheduling information (e.g., a second downlink assignment or a second uplink grant) for retransmission of the first transport block via a second cell. The second DCI may comprise a second field (e.g., a second HARQ process number field) indicating the first HARQ process number (e.g., the same HARQ process number indicated by the first DCI). In response to receiving the second DCI and based on the second scheduling information, the wireless device may transmit or receive the retransmission of the first transport block via the second cell.

In an example, the wireless device may determine, based at least on one of the DCI format or an RNTI associated with the DCI or a value of a field of the DCI, that the DCI is associated with scheduling transmission and retransmission of a transport block via a plurality of cells. In an example, the wireless device may determine, based at least on one of the DCI format or an RNTI associated with the DCI or a value of a field of the DCI, that an initial transmission of a transport block or a retransmission of a transport block scheduled by the DCI may be via different cells.

In an example, at least one of the first DCI and the second DCI may be associated with a first DCI format indicating that the DCI is associated with scheduling transmission and retransmission of a transport block via a plurality of cells or indicating that an initial transmission of a transport block or a retransmission of a transport block scheduled by the DCI may be via different cells.

In an example, at least one of the first DCI and the second DCI may be associated with a first RNTI (e.g., the CRC of the DCI may be scrambled with the first RNTI) indicating that the DCI is associated with scheduling transmission and retransmission of a transport block via a plurality of cells or indicating that an initial transmission of a transport block or a retransmission of a transport block scheduled by the DCI may be via different cells.

In an example, at least one of the first DCI and the second DCI may comprise a field with a value indicating that the DCI is associated with scheduling transmission and retransmission of a transport block via a plurality of cells or indicating that an initial transmission of a transport block or a retransmission of a transport block scheduled by the DCI may be via different cells.

In example embodiments a DCI may indicate transmission of a transport block and one or more repetitions of the transport block via a plurality of cells. In example embodiments, a field of the DCI and/or one or more configuration parameters (e.g., the DCI together with the one or more configuration parameters) may indicate the plurality of cells. In an example, the DCI may indicate time allocation and/or frequency allocation for the plurality of cells. In an example, the DCI may indicate the same time-domain and the same frequency-domain allocation for transmission of the transport block via the plurality of cells. In an example, the DCI may indicate the same time-domain allocation for the plurality of cells and may indicate cell-specific frequency allocation for the plurality of cells. The DCI may indicate one time allocation for the plurality of cells. The DCI may indicate one frequency allocation based on which cell-specific frequency allocation is derived. In an example, the DCI may indicate the same frequency-domain allocation for the plurality of cells and may indicate cell-specific time allocation for the plurality of cells. The DCI may indicate one frequency allocation for the plurality of cells. The DCI may indicate one time allocation based on which cell-specific time allocations for the plurality of cells are derived. In an example, the DCI may indicate cell-specific frequency-domain allocation for the plurality of cells and may indicate cell-specific time allocation for the plurality of cells. The DCI may indicate one frequency allocation based on which cell-specific frequency allocations for the plurality of cells are derived. The DCI may indicate one time allocation based on which cell-specific time allocations for the plurality of cells are derived.

Figure 20:
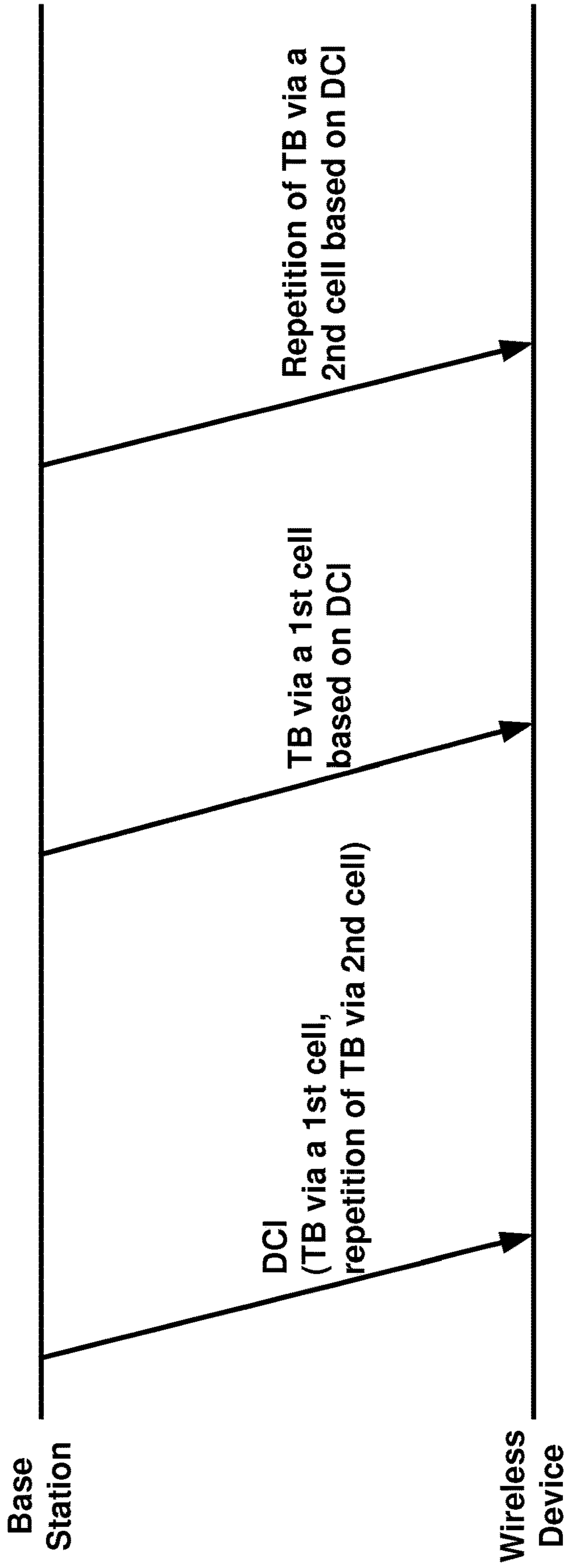
FIG. 20 shows an example process in accordance with several of various embodiments of the present disclosure.

In an example embodiment as shown in FIG. 20, a wireless device may receive a DCI comprising scheduling information for reception of a transport block via a first cell and reception of a first repetition of the transport block via a second cell. In an example, at least one of the first cell and the second cell may be a TDD cell with a TDD configuration. In response to receiving the DCI and based on the scheduling information, the wireless device may receive the transport block via the first cell and may receive the first repetition of the transport block via the second cell. In an example, the scheduling information may comprise first scheduling information, for reception of the transport block via the first cell, and second scheduling information for reception of the first repetition of the transport block via the second cell. In an example, the DCI may indicate and/or the scheduling information may be for reception of a plurality of repetitions of the transport block, via a plurality of cells, comprising the first repetition of the transport block via the first cell.

Figure 21:
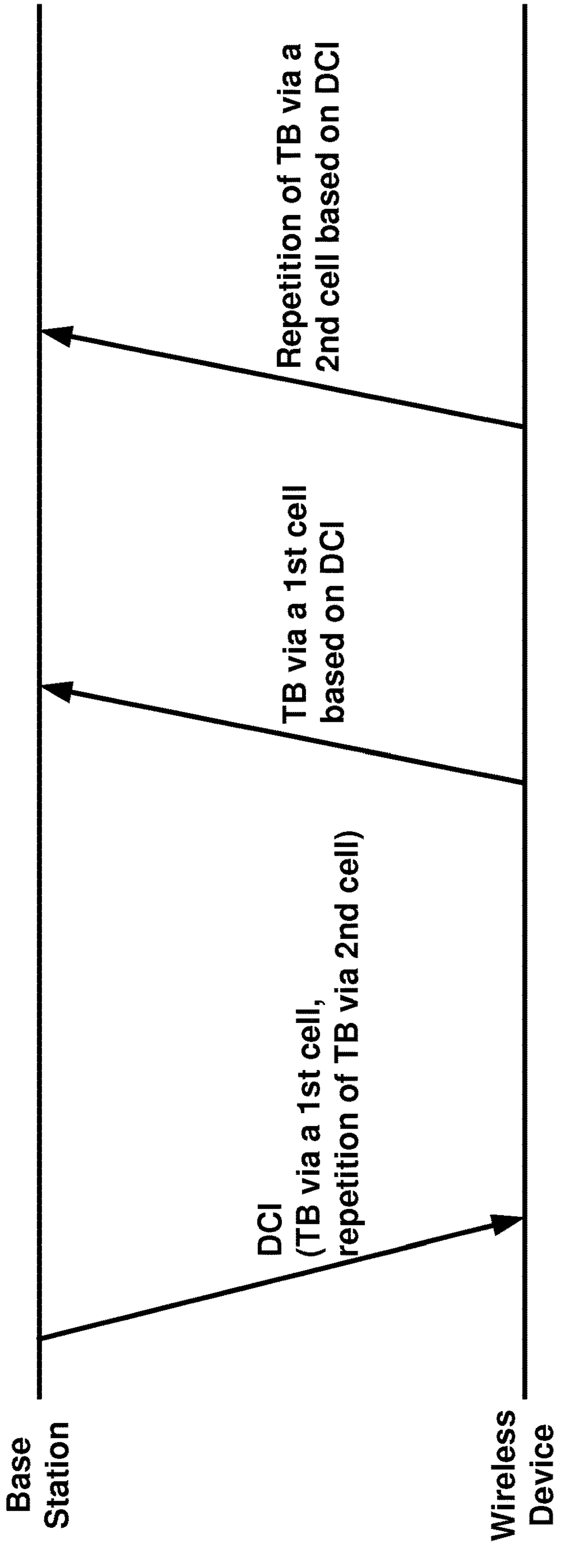
FIG. 21 shows an example process in accordance with several of various embodiments of the present disclosure.

In an example embodiment as shown in FIG. 21, a wireless device may receive a DCI comprising scheduling information for transmission of a transport block via a first cell and transmission of a first repetition of the transport block via a second cell. In an example, at least one of the first cell and the second cell may be a TDD cell with a TDD configuration. In response to receiving the DCI and based on the scheduling information, the wireless device may transmit the transport block via the first cell and may transmit the first repetition of the transport block via the second cell. In an example, the scheduling information may comprise first scheduling information, for transmission of the transport block via the first cell, and second scheduling information for transmission of the first repetition of the transport block via the second cell. In an example, the DCI may indicate and/or the scheduling information may be for transmission of a plurality of repetitions of the transport block, via a plurality of cells, comprising the first repetition of the transport block via the first cell.

The transmission or reception of the transport block via the first cell may be at a first timing. The transmission or reception of the first repetition of the transport block via the second cell may be at a second timing. In an example, the first timing and the second timing may overlap in at least one symbol. In an example, a difference between the first timing and the second timing (e.g., the starting time/symbol of the first timing and the second timing) may be less than a threshold (e.g., a configurable, e.g., an RRC configurable threshold). In an example, the threshold may be in terms of a first number of symbols. In an example, the symbol duration for the threshold may be based on a numerology/subcarrier spacing of a BWP (e.g., active BWP) of one of the first cell and the second cell. In an example, the symbol duration for the threshold may be based on a numerology/subcarrier spacing of a BWP (e.g., active BWP) of the first cell. In an example, the symbol duration for the threshold may be based on a numerology/subcarrier spacing of a BWP (e.g., active BWP) of the second cell.

A first BWP (e.g., first active BWP) of the first cell may be associated with a first numerology and a first subcarrier spacing. A second BWP (e.g., a second active BWP) of the second cell may be associated with a second numerology and a second subcarrier spacing. In an example, the first subcarrier spacing may be the same as the second subcarrier spacing. In an example, there may be an association between the first subcarrier spacing and the second subcarrier spacing. For example, the association between the first subcarrier spacing and the second subcarrier spacing may be pre-configured. For example, the association between the first subcarrier spacing and the second subcarrier spacing may be configurable based on one or more configuration parameters. The wireless device may receive one or more messages (e.g., one or more RRC messages) comprising the one or more configuration parameters.

The first cell may be associated with a first timing advance and/or may belong to a first timing advance group (TAG). The second cell may be associated with a second timing advance and/or may belong to a second TAG. In an example, the first timing advance may be the same as the second timing advance and/or the first TAG and the second TAG may be the same. In an example, there may be an association between the first timing advance/TAG and the second timing advance/TAG. For example, the association between the first timing advance/TAG and the second timing advance/TAG may be pre-configured. For example, the association between the first timing advance/TAG and the second timing advance/TAG may be configurable based on one or more configuration parameters. The wireless device may receive one or more messages (e.g., one or more RRC messages) comprising the one or more configuration parameters. In an example, a difference between the first timing advance and the second timing advance may be smaller than a threshold (e.g., a configurable threshold, e.g., an RRC configurable threshold). For example, the wireless device may receive an RRC message comprising a configuration parameter indicating the threshold.

In an example, in addition to repetition of the transport block across one or more cells, the transport block may be repeated in the time domain. The wireless device may transmit or receive the transport block via the first cell in a first timing. The wireless device may further transmit or receive a second repetition of the transport block via the first cell and in a second timing. For example, the first timing may be in a first slot and the second timing may be in a second slot. In an example, the first slot and the second slot may be adjacent slots. In an example, the first slot and the second slot may be based on a TDD configuration of the first cell. In an example the first timing may be one or more first symbols of a slot and the second timing may be one or more second symbols of the slot.

In an example, the wireless device may receive configuration parameters indicating a plurality of lists of cells. The plurality of lists of cells may comprise a first list of cells. The first list of cells may comprise one or more cells comprising the second cell wherein transmission or reception of the first repetition of the transport block takes place. In an example, the first list may further comprise the first cell wherein the transmission or reception of the transport block takes place. The DCI may indicate the first cell. For example, the DCI may comprise a field with a value indicating the first list. In an example, the first list may be associated with an identifier/index. The DCI may indicate the identifier/index. For example, the DCI may comprise a field with a value indicating the identifier/index of the first list.

In an example, the DCI may comprise one or more fields indicating time allocation (e.g., time domain resource allocation) for transmission or reception of the transport block via the first cell and transmission or reception of the first repetition of the transport block via the second cell. In an example, the DCI may indicate the same time allocation for transmission or reception of the transport block via the first cell and for transmission or reception of the first repetition of the transport block via the second cell. In an example, the DCI may indicate one time allocation for both of transmission/reception of the transport block via the first cell and transmission/reception of the first repetition of the transport block via the second cell. The wireless device may determine, based on the DCI (e.g., based on one or more fields of the DCI), time allocation for both of transmission/reception of the transport block via the first cell and transmission/reception of the first repetition of the transport block via the second cell. In an example, the DCI may indicate the first time allocation for transmission or reception of the transport block via the first cell and a second time allocation for transmission or reception of the first repetition of the transport block via the second cell. In an example, the DCI may comprise one or more first fields indicating a first time allocation for transmission or reception of the transport block via the first cell and one or more second fields indicating a second time allocation for transmission or reception of the first repetition of the transport block via the second cell. In an example, the DCI may indicate a first time allocation for transmission or reception of the transport block via the first cell and the wireless device may determine a second time allocation for transmission or reception of the first repetition of the transport block via the second cell based on the first time allocation.

In an example, the DCI may comprise one or more fields indicating frequency allocation (e.g., frequency domain resource allocation) for transmission or reception of the transport block via the first cell and transmission or reception of the first repetition of the transport block via the second cell. In an example, the DCI may indicate the same frequency allocation for transmission or reception of the transport block via the first cell and for transmission or reception of the first repetition of the transport block via the second cell. In an example, the DCI may indicate one frequency allocation for both of transmission/reception of the transport block via the first cell and transmission/reception of the first repetition of the transport block via the second cell. The wireless device may determine, based on the DCI (e.g., based on one or more fields of the DCI), frequency allocation for both of transmission/reception of the transport block via the first cell and transmission/reception of the first repetition of the transport block via the second cell. In an example, the DCI may indicate the first frequency allocation for transmission or reception of the transport block via the first cell and a second frequency allocation for transmission or reception of the first repetition of the transport block via the second cell. In an example, the DCI may comprise one or more first fields indicating a first frequency allocation for transmission or reception of the transport block via the first cell and one or more second fields indicating a second frequency allocation for transmission or reception of the first repetition of the transport block via the second cell. In an example, the DCI may indicate a first frequency allocation for transmission or reception of the transport block via the first cell and the wireless device may determine a second frequency allocation for transmission or reception of the first repetition of the transport block via the second cell based on the first frequency allocation.

In an example embodiment, a wireless device may receive a downlink control information (DCI) comprising scheduling information for retransmission of a first transport block via a second cell, wherein an initial transmission of the first transport block was via a first cell. The wireless device may transmit or may receive the retransmission of the first transport block via the second cell and based on the scheduling information. The wireless device may transmit or may receive the retransmission of the first transport block via the second cell and based on the DCI.

In an example, the DCI may indicate that the initial transmission of the first transport block was via the first cell.

In an example, the DCI may indicate one or more parameters associated with an initial transmission of the first transport block via the first cell. In an example, the wireless device may determine the initial transmission of the first transport block based on the one or more parameters. In an example, the wireless device may determine, based on the DCI, that the initial transmission of the first transport block was via the first cell. The wireless device may determine, based on the one or more parameters, that the initial transmission of the first transport block was via the first cell. In an example, the wireless device may determine, based on the DCI, that the initial transmission of the first transport block was via a cell different from the second cell. The wireless device may determine, based on the one or more parameters, that the initial transmission of the first transport block was via a cell different from the second cell.

In an example, the DCI may be associated with a first format. The first format may be used in scheduling a retransmission of a transport block via a cell different from an initial transmission of the transport block. The first format may be used in scheduling transmission and retransmission of a transport block via a plurality of cells. In an example, the DCI may indicate that the initial transmission of the first transport block was via the first cell based on the DCI being associated with the first format. In an example, the DCI may indicate that the initial transmission of the first transport block was via a cell different from the second (cell that the retransmission of the first transport block is scheduled) based on the DCI being associated with the first format. In an example, the wireless device may determine, based on the DCI being associated with the first format, that the DCI is used in scheduling a retransmission of a transport block via a cell different from an initial transmission of the transport block. In an example, the wireless device may determine, based on the DCI being associated with the first format, that the DCI is used in scheduling transmission and retransmission of a transport block via a plurality of cells.

In an example, the DCI may be associated with a first radio network temporary identifier (RNTI). The first RNTI may be used in scheduling a retransmission of a transport block via a cell different from an initial transmission of the transport block. The first RNTI may be used in scheduling transmission and retransmission of a transport block via a plurality of cells. In an example, the DCI may indicate that the initial transmission of the first transport block was via the first cell based on the DCI being associated with the first RNTI. In an example, the DCI may indicate that the initial transmission of the first transport block was via a cell different from the second cell (that the retransmission of the first transport block is scheduled) based on the DCI being associated with the first RNTI. In an example, a cyclic redundancy code associated with the DCI may be scrambled with the first RNTI. In an example, the wireless device may determine, based on the DCI being associated with the first RNTI, that the DCI is used in scheduling a retransmission of a transport block via a cell different from an initial transmission of the transport block. In an example, the wireless device may determine, based on the DCI being associated with the first RNTI, that the DCI is used in scheduling transmission and retransmission of a transport block via a plurality of cells.

In an example, the DCI may comprise a field having a first value. The first value of the field may indicate that the DCI is used in scheduling a retransmission of a transport block via a cell different from an initial transmission of the transport block. The first value of the field may be used in scheduling transmission and retransmission of a transport block via a plurality of cells. In an example, the DCI may indicate that the initial transmission of the first transport block was via the first cell based on the DCI comprising the field having the first value. In an example, the DCI may indicate that the initial transmission of the first transport block was via a cell different from the second cell (that the retransmission of the first transport block is scheduled) based on the DCI comprising the field having the first value. In an example, the wireless device may determine, based on the field of the DCI having the first value, that the DCI is used in scheduling a retransmission of a transport block via a cell different from an initial transmission of the transport block. The wireless device may determine, based on the field of the DCI having the first value, that the DCI is used in scheduling transmission and retransmission of a transport block via a plurality of cells. In an example, the field may be associated with a parameter, wherein a value of the parameter for the retransmission of the transport block via the second cell may be the same as the value of the parameter used in the transmission of the transport block via the first cell. In an example, the field may be a resource assignment field (e.g., a time domain resource assignment field or a frequency domain resource assignment field) or a new data indicator field or a HARQ process number field or a redundancy version field or a transmission configuration indicator (TCI) field, or another field of the DCI.

In an example, the scheduling information may comprise an uplink grant.

In an example, the scheduling information may comprise a downlink assignment.

In an example, the DCI may comprise a first field with a value indicating a first identifier of the first cell. In an example, the wireless device may determine the second cell (e.g., a second identifier of the second cell) based on the first cell (e.g., the first identifier of the first cell). In an example, the determining the second cell (e.g., the second identifier of the second cell) may be based on a configuration parameter (e.g., an RRC configuration parameter). In an example, the wireless may receive the configuration parameter (e.g., the RRC configuration parameter) for example via an RRC message. In an example, the configuration parameter may indicate an offset (e.g., an offset to the first identifier of the first cell). In an example, the configuration parameter may indicate an association between the first cell (e.g., the first identifier of the first cell) and the second cell (e.g., the second identifier of the second cell). In an example, the wireless device may determine the second cell (e.g., the identifier of the second cell) based on the first cell (e.g., the identifier of the first cell) and the association indicated by the configuration parameter.

In an example, the DCI may comprise a second field with a value indicating a second identifier of the second cell. In an example, the wireless device may determine the first cell (e.g., a first identifier of the first cell) based on the second cell (e.g., the second identifier of the second cell). In an example, the determining the first cell (e.g., the first identifier of the first cell) may be based on a configuration parameter (e.g., an RRC configuration parameter). In an example, the wireless device may receive the configuration parameter (e.g., the RRC configuration parameter) for example via an RRC message. In an example, the configuration parameter may indicate an offset (e.g., an offset to the second identifier of the second cell). In an example, the configuration parameter may indicate an association between the first cell (e.g., the first identifier of the first cell) and the second cell (e.g., the second identifier of the second cell). In an example, the wireless device may determine the first cell (e.g., the identifier of the first cell) based on the second cell (e.g., the identifier of the second cell) and the association indicated by the configuration parameter.

In an example, the DCI may further indicate that the initial transmission of the first transport block, via the first cell, was associated with a first HARQ process number. In an example, the DCI may comprise a field with a value indicating the first HARQ process number. In an example, a second HARQ process number, associated with the retransmission of the first transport block, may be the same as the first HARQ process number. In an example, the wireless device may determine a second HARQ process number, associated with the retransmission of the first transport block, based on the first HARQ process number. In an example, the determining the second HARQ process number may further be based on a configuration parameter (e.g., an RRC configuration parameter). In an example, the wireless device may receive the configuration parameter (e.g., the RRC configuration parameter) for example via an RRC message. In an example, the configuration parameter may indicate an offset (e.g., an offset to the first HARQ process number). In an example, the configuration parameter may indicate an association between the first HARQ process number (the first HARQ process number associated with the first cell) and the second HARQ process number (the second HARQ process number associated with the second cell). In an example, the wireless device may determine the second HARQ process number (the second HARQ process number associated with the second cell) based on the first HARQ process number (the first HARQ process number associated with the first cell) and the association indicated by the configuration parameter. In an example, the determining the second HARQ process may further be based on a pre-configured parameter. In an example, the preconfigured parameter may indicate an offset (e.g., an offset to the first HARQ process number). In an example, the pre-configured parameter may indicate an association between the first HARQ process number (the first HARQ process number associated with the first cell) and the second HARQ process number (the second HARQ process number associated with the second cell). In an example, the wireless device may determine the second HARQ process number (the second HARQ process number associated with the second cell) based on the first HARQ process number (the first HARQ process number associated with the first cell) and the association indicated by the pre-configured parameter.

In an example, the downlink control information may further indicate that the retransmission of the first transport block is associated with a second HARQ process number. In an example, the downlink control information may comprise a field with a value indicating the second HARQ process number. In an example, a first HARQ process number, associated with the initial transmission of the first transport block, is the same as the second HARQ process number. In an example, the wireless device may determine a first HARQ process number, associated with the initial transmission of the first transport block, based on the second HARQ process number. In an example, the determining the first HARQ process number may further be based on a configuration parameter (e.g., an RRC configuration parameter). In an example, the wireless device may receive the configuration parameter (e.g., the RRC configuration parameter) for example via an RRC message. In an example, the configuration parameter may indicate an offset (e.g., an offset to the second HARQ process number). In an example, the configuration parameter may indicate an association between the first HARQ process number (e.g., the first HARQ process number associated with the first cell) and the second HARQ process number (e.g., the second HARQ process number associated with the second cell). In an example, the wireless device may determine the first HARQ process number (the first HARQ process number associated with the first cell) based on the second HARQ process number (the second HARQ process number associated with the second cell) and the association indicated by the configuration parameter. In an example, the determining the first HARQ process may further be based on a pre-configured parameter. In an example, the preconfigured parameter may indicate an offset (e.g., an offset to the second HARQ process number). In an example, the pre-configured parameter may indicate an association between the first HARQ process number (the first HARQ process number associated with the first cell) and the second HARQ process number (the second HARQ process associated with the second cell). In an example, the wireless device may determine the first HARQ process number (the first HARQ process number associated with the first cell) based on the second HARQ process number (the second HARQ process number associated with the second cell) and the association indicated by the pre-configured parameter.

In an example, the initial transmission of the transport block, via the first cell, may be associated with a first redundancy version. The retransmission of the transport block, via the second cell, may be associated with a second redundancy version. In an example, the DCI may comprise a field with a value indicating the first redundancy version. In an example, the wireless device may determine the second redundancy version based on the first redundancy version. In an example, the determining the second redundancy version may further be based on a configuration parameter (e.g., an RRC configuration parameter). In an example, the wireless device may receive the configuration parameter (e.g., the RRC configuration parameter) for example via an RRC message. In an example, the configuration parameter may indicate an offset (e.g., an offset to the first redundancy version). In an example, the configuration parameter may indicate an association between the first redundancy version and the second redundancy version. In an example, the wireless device may determine the second redundancy version (the second redundancy version associated with the retransmission of the first transport block) based on the first redundancy version (the first redundancy version associated with the initial transmission of the first transport block) and the association indicated by the configuration parameter. In an example, the determining the second redundancy version may further be based on a pre-configured parameter. In an example, the preconfigured parameter may indicate an offset (e.g., an offset to the first redundancy version). In an example, the pre-configured parameter may indicate an association between the first redundancy version and the second redundancy version. In an example, the wireless device may determine the second redundancy version (the second redundancy version associated with the retransmission of the first transport block) based on the first redundancy version (the first redundancy version associated with the initial transmission of the first transport block) and the association indicated by the pre-configured parameter. In an example, the DCI may comprise a field with a value indicating the second redundancy version. In an example, the wireless device may determine the first redundancy version based on the second redundancy version. In an example, the determining the first redundancy version may further be based on a configuration parameter (e.g., an RRC configuration parameter). In an example, the wireless device may receive the configuration parameter (e.g., the RRC configuration parameter) for example via an RRC message. In an example, the configuration parameter may indicate an offset (e.g., an offset to the second redundancy version). In an example, the configuration parameter may indicate an association between the first redundancy version and the second redundancy version. In an example, the wireless device may determine the first redundancy version (the first redundancy version associated with the initial transmission of the first transport block) based on the second redundancy version (the second redundancy version associated with the retransmission of the first transport block) and the association indicated by the configuration parameter. In an example, the determining the first redundancy version may further be based on a pre-configured parameter. In an example, the preconfigured parameter may indicate an offset (e.g., an offset to the second redundancy version). In an example, the pre-configured parameter may indicate an association between the first redundancy version and the second redundancy version. In an example, the wireless device may determine the second redundancy version (the second redundancy version associated with the retransmission of the first transport block) based on the first redundancy version (the first redundancy version associated with the initial transmission of the first transport block) and the association indicated by the pre-configured parameter.

In an example, at least one of the first cell and the second cell is a time division duplexing (TDD) cell.

In an example, the first cell (e.g., a BWP or an active BWP of the first cell) is associated with a first subcarrier spacing. The second cell (e.g., a BWP or an active BWP of the second cell) may be associated with a second subcarrier spacing. In an example, the first subcarrier spacing may be the same as the second subcarrier spacing. In an example, there may be an association between the first subcarrier spacing and the second subcarrier spacing. In an example, there may be an association between the BWP of the first cell and the BWP of the second cell. In an example, the association may be pre-configured. In an example, the wireless device may receive a configuration parameter indicating the association.

In an example, the wireless device may receive configuration parameters of a plurality of cell groups. The first cell and the second cell may be in the same cell group. The first cell and the second cell may be in a first cell group of the plurality of cell groups. In an example, the first cell group may be a master cell group. In an example, the first cell group may be a secondary cell group.

In an example, the DCI may comprise a code block group (CBG) transmission indication (CBGTI) field comprising a plurality of bits. Each bit in the plurality of bits may correspond to a corresponding CBG in a plurality of CBGs. The CBGTI field may indicate which one or more CBGs in the plurality of CBGs are retransmitted.

In an example, the DCI may comprise a code block group (CBG) flushing out information (CBGFI) field comprising a plurality of bits. Each bit in the plurality of bits may correspond to a corresponding CBG in a plurality of CBGs. The CBGFI field may indicate which one or more first CBGs in the plurality of CBGs are corrupted and which one or more second CBGs in the plurality of CBGs are combinable with the earlier received instances of the one or more second CBGs.

In an example, the DCI may comprise a HARQ process number field indicating a first HARQ process number. In an example, the first HARQ process number may be one of one or more first HARQ process numbers. The one or more first HARQ process numbers may be associated with transmission or retransmission of a transport block via a plurality of cells. In an example, the plurality of cells may comprise the first cell and the second cell. In an example, the wireless device may determine, based on the first HARQ process number being one of the one or more first HARQ process numbers, that the first transport block is retransmission of a transport block initially transmitted via a cell different from the second cell.

In an example embodiment, a wireless device may receive a first downlink control information (DCI) comprising first scheduling information for transmission of a first transport block via a first cell. The first transport block may be associated with a first HARQ process number of one or more first HARQ process numbers. The one or more first HARQ process numbers may be associated with transmission or retransmission of a transport block via a plurality of cells comprising the first cell and a second cell. The wireless device may receive or may transmit the first transport block based on the first scheduling information and via the first cell. The wireless device may receive or may transmit the first transport block based on the first DCI and via the first cell. The wireless device may receive a second DCI comprising second scheduling information for retransmission of the first transport block via the second cell. The wireless device may receive or may transmit the retransmission of the first transport block based on the second scheduling information and via the second cell. The wireless device may receive or may transmit the retransmission of the first transport block based on the second DCI and via the second cell.

In an example, the first scheduling information may comprise a first uplink grant or a first downlink assignment.

In an example, the second scheduling information may comprise a second uplink grant or a second downlink assignment.

In an example, the second DCI may indicate the first HARQ process.

In an example, the wireless device may receive one or more configuration parameters (e.g., one or more RRC parameters) indicating the one or more first HARQ process numbers.

In an example, at least one of the first DCI and the second DCI may be associated with a first format used in scheduling transmission or retransmission of a transport block via a plurality of cells.

In an example, at least one of the first DCI and the second DCI may be associated with a first radio network temporary identifier (RNTI) used in scheduling transmission or retransmission of a transport block via a plurality of cells. In an example, a cyclic redundancy code associated with at least one of the first DCI and the second DCI may be scrambled with the first RNTI.

In an example, at least one of the first DCI and the second DCI may comprise a field with a value indicating that the at least one of the first DCI and the second DCI is used in scheduling transmission or retransmission of a transport block via a plurality of cells.

In an example embodiment, a wireless device may receive a downlink control information (DCI) comprising scheduling information for transmission or reception of a transport block via a first cell and transmission or reception of a first repetition of the transport block via a second cell. The wireless device may transmit or receive, based on the DCI, the transport block via the first cell and the first repetition of the transport block via the second cell. The wireless device may transmit or receive, based on the scheduling information, the transport block via the first cell and the first repetition of the transport block via the second cell.

In an example, the DCI may indicate transmission or reception of repetitions of the transport block via a plurality of cells comprising the second cell.

In an example, the DCI may indicate transmission or reception of the transport block via the first cell at a first timing. The DCI may indicate transmission or reception of the first repetition of the transport block via the second cell and at a second timing. The first timing and the second timing may overlap in at least one symbol. In an example, a difference between the first timing and the second timing may be less than a threshold. In an example, the wireless device may receive a configuration parameter (e.g., may receive an RRC message comprising a configuration parameter) indicating the threshold. In an example, the threshold may be in terms of a first number of symbols. In an example, a duration of a symbol may be based on a first subcarrier spacing associated with the first cell (e.g., a first/active BWP of the first cell).

In an example, the first cell (e.g., a first/active BWP of the first cell) may be associated with a first subcarrier spacing. The second cell (e.g., a second/active BWP of the second cell) may be associated with a second subcarrier spacing. In an example, the first subcarrier spacing may be the same as the second subcarrier spacing. In an example, the wireless device may receive a configuration parameter indicating an association between the first subcarrier spacing and the second subcarrier spacing.

In an example, the DCI may indicate transmission of the transport block via the first cell associated with a first timing advance. The DCI may indicate transmission of the first repetition of the transport block via the second cell associated with a second timing advance. In an example, the first timing advance and the second timing advance may be the same. The first cell and the second cell may be in the same timing advance group. In an example, a difference between the first timing advance and the second timing advance may be smaller than a threshold. In an example, the wireless device may receive a configuration parameter (e.g., may receive an RRC configuration parameter via an RRC message) indicating the threshold.

In an example, the DCI may indicate transmission or reception of the transport block via the first cell at a first timing. The DCI may indicate transmission or reception of a second repetition of the transport block via the first cell at a second timing.

In an example, the wireless device may receive one or more configuration parameters indicating a plurality of lists of cells comprising a first list of cells comprising the second cell. The first cell may be associated with a first index/identifier. The DCI may indicate the first index/identifier. In an example, the first list of cells may further comprise the first cell. In an example, the receiving the DCI may be via the first cell. In an example, the DCI may comprise a field with a value indicating the first cell. In an example, the DCI may comprise a field indicating the first index/identifier. In an example, the DCI may comprise one or more fields indicating a time allocation for transmission or reception of the transport block via the first cell. The one or more fields may indicate a time allocation for transmission or reception of the first repetition of the transport block via the second cell. In an example, the DCI may indicate the same time allocation for transmission or reception of the transport block via the first cell and for transmission or reception of the first repetition of the transport block via the second cell.

In an example, the DCI may comprise one or more fields indicating: a first time allocation for transmission or reception of the transport block via the first cell, and a second time allocation for transmission or reception of the transport block via the second cell.

In an example, the wireless device may determine a second time allocation, for transmission or reception of the first repetition of the transport block via the second cell based on a first time allocation for transmission or reception of the transport block via the first cell. The DCI may comprise one or more fields indicating the first time allocation.

In an example, the DCI may comprise one or more fields indicating a frequency allocation for transmission or reception of the transport block via the first cell. The one or more field may indicate a frequency allocation for transmission or reception of the first repetition of the first transport block via the second cell. In an example, the DCI may indicate the same frequency allocation for transmission or reception of the transport block via the first cell and for transmission or reception of the first repetition of the transport block via the second cell.

In an example, the DCI may comprise one or more fields indicating a first frequency allocation for transmission or reception of the transport block via the first cell. The one or more field may indicate a second frequency allocation for transmission or reception of the transport block via the second cell.

In an example, the wireless device may determine a second frequency allocation, for transmission or reception of the first repetition of the transport block via the second cell based on a first frequency allocation for transmission or reception of the transport block via the first cell. The DCI comprises one or more fields indicating the first frequency allocation.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 22:
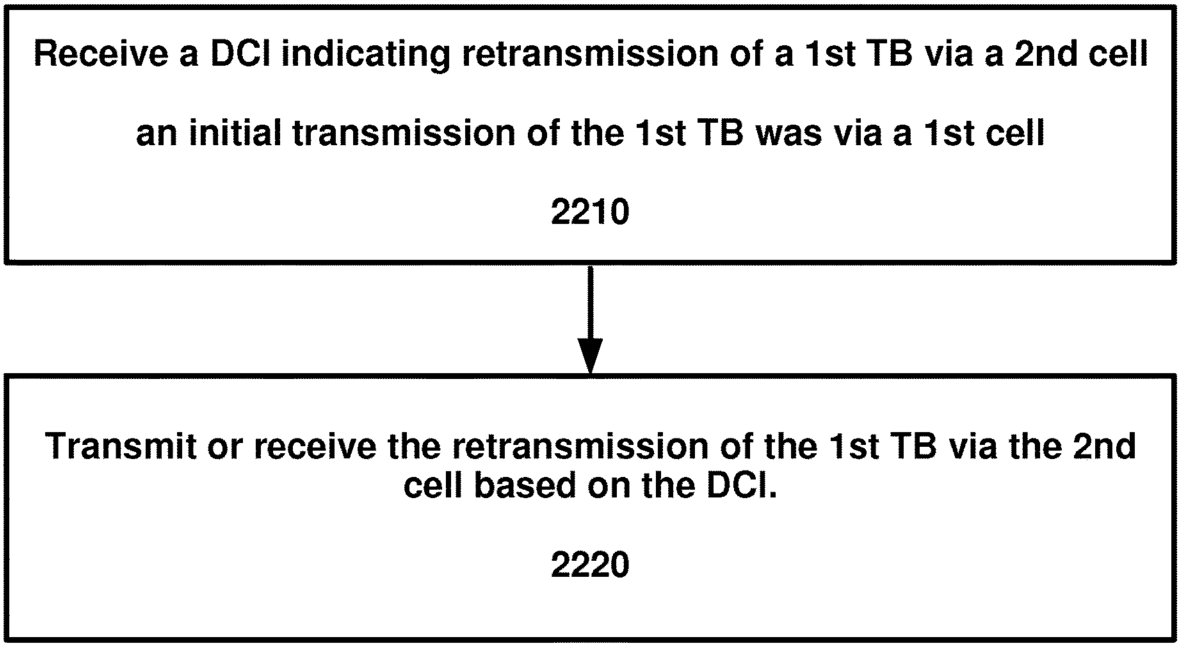
FIG. 22 shows an example flow diagram in accordance with several of various embodiments of the present disclosure.

FIG. 22 shows an example flow diagram in accordance with several of various embodiments of the present disclosure. At 2210, a wireless device may receive a downlink control information (DCI) indicating retransmission of a first transport block via a second cell. An initial transmission of the first transport block may be via a first cell. At 2220, the wireless device may transmit or may receive retransmission of the first transport block via the second cell based on the DCI.

In an example embodiment, the DCI, received at 2210, may indicate that that the initial transmission of the first transport block was via a first cell.

In an example embodiment, the DCI, received at 2210, may comprise scheduling information for retransmission of the first transport block. The transmitting or the receiving the retransmission of the first transport bock, at 2220, may be based on the scheduling information. In an example embodiment, the scheduling information may comprise an uplink grant. In an example embodiment, the scheduling information may comprise a downlink assignment.

In an example embodiment, at least one of a format associated with the DCI received at 2210, a radio network temporary identifier (RNTI) associated with the DCI, received at 2210, and a value of a field of the DCI, received at 2210, may indicate that the initial transmission of the first transport block and the retransmission of the first transport block are via different cells. In an example embodiment, the DCI may be associated with a first format. The first format may be used in scheduling a retransmission of a transport block via a cell that is different from a cell used for an initial transmission of the transport block and/or may be used in scheduling transmission and retransmission of a transport block via a plurality of cells. In an example embodiment, the DCI, received at 2210, may indicate that the initial transmission of the first transport block was via the first cell and/or via a cell that is different from the second cell (e.g., the second cell on which the retransmission of the first transport block is scheduled) based on the DCI being associated with the first format. In an example embodiment, the wireless device may determine, based on the DCI received at 2210 being associated with the first format, that the DCI is used in scheduling a retransmission of a transport block via a cell that is different from a cell used for an initial transmission of the transport block and/or in scheduling transmission and retransmission of a transport block via a plurality of cells. In an example embodiment, the DCI may be associated with a first radio network temporary identifier (RNTI). The first RNTI may be used in scheduling a retransmission of a transport block via a cell different from an initial transmission of the transport block and/or in scheduling transmission and retransmission of a transport block via a plurality of cells. In an example embodiment, the DCI, received at 2210, may indicate that the initial transmission of the first transport block was via the first cell and/or via a cell different from the second cell (e.g., the second cell on which the retransmission of the first transport block is scheduled) based on the DCI being associated with the first RNTI. In an example embodiment, a cyclic redundancy code associated with the DCI may be scrambled with the first RNTI. In an example embodiment, the wireless device may determine, based on the DCI being associated with the first RNTI, that the DCI is used in scheduling a retransmission of a transport block via a cell different from an initial transmission of the transport block and/or that the DCI is used in scheduling transmission and retransmission of a transport block via a plurality of cells. In an example embodiment, the DCI may comprise a field with a first value. The first value of the field may indicate that the DCI is used in scheduling a retransmission of a transport block via a cell different from an initial transmission of the transport block and/or that the DCI is used in scheduling transmission and retransmission of a transport block via a plurality of cells. In an example embodiment, the DCI may indicate that the initial transmission of the first transport block was via the first cell and/or was via a cell different from the second cell (e.g., the second cell on which the retransmission of the first transport block is scheduled) based on the DCI comprising the field having the first value. In an example embodiment, the wireless device may determine, based on the field of the DCI having the first value, that the DCI is used in scheduling a retransmission of a transport block via a cell different from an initial transmission of the transport block and/or that the DCI is used in scheduling transmission and retransmission of a transport block via a plurality of cells. In an example embodiment, the field may be associated with a parameter, wherein a value of the parameter for the retransmission of the transport block via the second cell may be the same as the value of the parameter used in the transmission of the transport block via the first cell. In an example embodiment, the field may be a resource assignment field or a new data indicator field or a HARQ process number field or a redundancy version field or a transmission configuration indicator (TCI) field.

In an example embodiment, a value of a field of the DCI, received at 2210, may indicate the first cell or may indicate the second cell. In an example embodiment, the DCI, received at 2210, may comprise a first field with a value indicating a first identifier of the first cell. In an example embodiment, the wireless device may determine the second cell (e.g., a second identifier of the second cell) based on the first cell (e.g., the first identifier of the first cell). In an example embodiment, the wireless device may determine the second cell (e.g., the second identifier of the second cell) based on a configuration parameter (e.g., an RRC configuration parameter). In an example embodiment, the wireless device may receive the configuration parameter, e.g., the RRC configuration parameter, for example, via an RRC message. In an example embodiment, the configuration parameter may indicate an offset (e.g., an offset to the first identifier of the first cell). In an example embodiment, the DCI may comprise a second field with a value indicating a second identifier of the second cell. In an example embodiment, the wireless device may determine the first cell (e.g., a first identifier of the first cell) based on the second cell (e.g., the second identifier of the second cell). In an example embodiment, the determining the first cell (e.g., the first identifier of the first cell) may be based on a configuration parameter (e.g., an RRC configuration parameter). In an example embodiment, the wireless device may receive the configuration parameter, e.g., an RRC configuration parameter, for example, via an RRC message.

In an example embodiment, the wireless device may receive a first configuration parameter indicating an association between the first cell and the second cell. The wireless device may determine the second cell or the first cell based on the first configuration parameter. In an example embodiment, the configuration parameter may indicate an offset (e.g., an offset to the second identifier of the second cell). In an example embodiment, the configuration parameter may indicate an association between a first identifier of the first cell and a second identifier of the second cell. In an example embodiment, the wireless device may determine the second cell (e.g., the identifier of the second cell) based on the first cell (e.g., the identifier of the first cell) and the association indicated by the configuration parameter. In an example embodiment, the wireless device may determine the first cell (e.g., the identifier of the first cell) based on the second cell (e.g., the identifier of the second cell) and the association indicated by the configuration parameter.

In an example embodiment, a second hybrid automatic repeat request (HARQ) process number associated with the retransmission of the first transport block, transmitted or received via the second cell at 2220, may be based on the first HARQ process number associated with the initial transmission of the first transport block via the first cell. In an example embodiment, the DCI may further indicate that the initial transmission of the first transport block, via the first cell, was associated with a first HARQ process number. In an example embodiment, the DCI may comprise a field with a value indicating the first HARQ process number. In an example embodiment, the wireless device may determine a second HARQ process number, associated with the retransmission of the first transport block, based on the first HARQ process number. In an example embodiment, the determining the second HARQ process number may further be based on a pre-configured parameter. In an example embodiment, the pre-configured parameter may indicate an offset (e.g., an offset to the first HARQ process number). In an example embodiment, the pre-configured parameter may indicate an association between the first HARQ process number (e.g., the first HARQ process number associated with the first cell/initial transmission of the first transport block) and the second HARQ process number (the second HARQ process number associated with the second cell/retransmission of the first transport block). In an example embodiment, the wireless device may determine the second HARQ process number (e.g., the second HARQ process number associated with the second cell/retransmission of the first transport block) based on the first HARQ process number (e.g., the first HARQ process number associated with the first cell/initial transmission of the first transport block) and the association indicated by the pre-configured parameter. In an example embodiment, the second HARQ process number may be the same as the first HARQ process number. In an example embodiment, the second HARQ process number may be based on a configuration parameter. In an example embodiment, the wireless device may determine the second HARQ process number based on the configuration parameter. In an example embodiment, the wireless device may receive the configuration parameter, e.g., an RRC configuration parameter, for example, via an RRC message. In an example embodiment, the configuration parameter may indicate an offset (e.g., an offset to the first HARQ process number). In an example embodiment, the configuration parameter may indicate an association between the first HARQ process number (e.g., the first HARQ process number associated with the first cell/initial transmission of the first transport block) and the second HARQ process number (e.g., the second HARQ process number associated with the second cell/retransmission of the first transport block). In an example embodiment, the wireless device may determine the second HARQ process number (e.g., the second HARQ process number associated with the second cell/retransmission of the first transport block) based on the first HARQ process number (e.g., the first HARQ process number associated with the first cell/initial transmission of the first transport block) and the association indicated by the configuration parameter.

In an example embodiment, a redundancy version associated with the retransmission of the first transport block, transmitted or received via the second cell at 2220, may be based on the first redundancy version associated with the initial transmission of the first transport block via the first cell. In an example embodiment, the second redundancy version may be the same as the first redundancy version.

In an example embodiment, the DCI, received at 2210, may indicate one or more parameters associated with the initial transmission of the first transport block via the first cell. In an example embodiment, the wireless device may determine the initial transmission of the first transport block based on the one or more parameters. In an example embodiment, the wireless device may determine, based on the DCI received at 2210 (e.g., based on the one or more parameters indicated by the DCI received at 2210), that the initial transmission of the first transport block was via the first cell. In an example embodiment, the wireless device may determine, based on the DCI received at 2210 (e.g., based on the one or more parameters indicated by the DCI received at 2210), that the initial transmission of the first transport block was via a cell different from the second cell.

In an example embodiment, the DCI, received at 2210, may further indicate that the retransmission of the first transport block is associated with a second HARQ process number. In an example embodiment, the DCI may comprise a field with a value indicating the second HARQ process number. In an example, a first HARQ process number, associated with the initial transmission of the first transport block, may be the same as the second HARQ process number. In an example embodiment, the wireless device may determine a first HARQ process number, associated with the initial transmission of the first transport block, based on the second HARQ process number. In an example embodiment, the determining the first HARQ process number may further be based on a configuration parameter (e.g., an RRC configuration parameter). In an example embodiment, the wireless device may receive the configuration parameter, e.g., the RRC configuration parameter, for example, via an RRC message. In an example embodiment, the configuration parameter may indicate an offset (e.g., an offset to the second HARQ process number). In an example embodiment, the configuration parameter may indicate an association between the first HARQ process number (e.g., the first HARQ process number associated with the first cell) and the second HARQ process number (e.g., the second HARQ process number associated with the second cell). In an example embodiment, the determining the first HARQ process may further be based on a pre-configured parameter. In an example embodiment, the preconfigured parameter may indicate an offset (e.g., an offset to the second HARQ process number). In an example embodiment, the pre-configured parameter may indicate an association between the first HARQ process number (e.g., the first HARQ process number associated with the first cell) and the second HARQ process number (e.g., the second HARQ process associated with the second cell). In an example embodiment, the wireless device may determine the first HARQ process number (e.g., the first HARQ process number associated with the first cell) based on the second HARQ process number (e.g., the second HARQ process number associated with the second cell) and the association indicated by the pre-configured parameter. In an example embodiment, the initial transmission of the transport block, via the first cell, may be associated with a first redundancy version. The retransmission of the transport block, via the second cell, may be associated with a second redundancy version. In an example embodiment, the DCI may comprise a field with a value indicating the first redundancy version. In an example embodiment, the wireless device may determine the second redundancy version based on the first redundancy version. In an example embodiment, the determining the second redundancy version may further be based on a configuration parameter (e.g., an RRC configuration parameter). In an example embodiment, the wireless device may receive the configuration parameter, e.g., the RRC configuration parameter, for example, via an RRC message. In an example embodiment, the configuration parameter may indicate an offset, e.g., an offset to the first redundancy version. In an example embodiment, the configuration parameter may indicate an association between the first redundancy version and the second redundancy version. In an example embodiment, the wireless device may determine the second redundancy version (e.g., the second redundancy version associated with the retransmission of the first transport block) based on the first redundancy version (e.g., the first redundancy version associated with the initial transmission of the first transport block) and the association indicated by the configuration parameter. In an example embodiment, the determining the second redundancy version may further be based on a pre-configured parameter. In an example embodiment, the preconfigured parameter may indicate an offset (e.g., an offset to the first redundancy version). In an example embodiment, the pre-configured parameter may indicate an association between the first redundancy version and the second redundancy version. In an example embodiment, the wireless device may determine the second redundancy version (e.g., the second redundancy version associated with the retransmission of the first transport block) based on the first redundancy version (e.g., the first redundancy version associated with the initial transmission of the first transport block) and the association indicated by the pre-configured parameter. In an example embodiment, the DCI may comprise a field with a value indicating the second redundancy version. In an example embodiment, the wireless device may determine the first redundancy version based on the second redundancy version. In an example embodiment, the determining the first redundancy version may further be based on a configuration parameter (e.g., RRC configuration parameter). In an example embodiment, the wireless device may receive the configuration parameter (e.g., the RRC configuration parameter) for example via an RRC message. In an example embodiment, the configuration parameter may indicate an offset (e.g., an offset to the second redundancy version). In an example embodiment, the configuration parameter may indicate an association between the first redundancy version and the second redundancy version. In an example embodiment, the wireless deice may determine the first redundancy version (e.g., the first redundancy version associated with the initial transmission of the first transport block) based on the second redundancy version (e.g., the second redundancy version associated with the retransmission of the first transport block) and the association indicated by the configuration parameter. In an example embodiment, the determining the first redundancy version may further be based on a pre-configured parameter. In an example embodiment, the preconfigured parameter may indicate an offset (e.g., an offset to the second redundancy version). In an example embodiment, the pre-configured parameter may indicate an association between the first redundancy version and the second redundancy version. In an example embodiment, the wireless device may determine the second redundancy version (e.g., the second redundancy version associated with the retransmission of the first transport block) based on the first redundancy version (e.g., the first redundancy version associated with the initial transmission of the first transport block) and the association indicated by the pre-configured parameter.

In an example embodiment, at least one of the first cell and the second cell may be a time division duplexing (TDD) cell.

In an example embodiment, the first cell or a BWP/an active BWP of the first cell may be associated with a first subcarrier spacing. The second cell or a BWP/an active BWP of the second cell may be associated with a second subcarrier spacing. In an example embodiment, the first subcarrier spacing may be the same as the second subcarrier spacing. In an example embodiment, there may be an association between the first subcarrier spacing and the second subcarrier spacing. In an example, there may be an association between the first cell or the BWP of the first cell and the second cell or the BWP of the second cell. In an example embodiment, the association may be pre-configured. In an example embodiment, the wireless device may receive a configuration parameter indicating the association.

In an example embodiment, the wireless device may receive configuration parameters of a plurality of cell groups, wherein the first cell and the second cell are in the same cell group (e.g., in a first cell group of the plurality of cell groups). In an example embodiment, the first cell group may be a master cell group. In an example embodiment, the first cell group may be a secondary cell group.

In an example embodiment, the DCI, received at 2210, may comprise a code block group (CBG) transmission indication (CBGTI) field comprising a plurality of bits. Each bit in the plurality of bits may correspond to a corresponding CBG in a plurality of CBGs. The CBGTI field may indicate which one or more CBGs in the plurality of CBGs are retransmitted.

In an example embodiment, the DCI, received at 2210, may comprise a code block group (CBG) flushing out information (CBGFI) field comprising a plurality of bits. Each bit in the plurality of bits may correspond to a corresponding CBG in a plurality of CBGs. The CBGFI field may indicate which one or more first CBGs in the plurality of CBGs are corrupted and which one or more second CBGs in the plurality of CBGs are combinable with the earlier received instances of the one or more second CBGs.

In an example embodiment, the DCI, received at 2210, may comprise a HARQ process number field indicating a first HARQ process number. In an example embodiment, the first HARQ process number may be one of one or more first HARQ process numbers. The one or more first HARQ process numbers may be associated with transmission or retransmission of a transport block via a plurality of cells. In an example embodiment, the plurality of cells may comprise the first cell and the second cell. In an example embodiment, the wireless device may determine, based on the first HARQ process number being one of the one or more first HARQ process numbers, that the first transport block is retransmission of a transport block initially transmitted via a cell different from the second cell.

Figure 23:
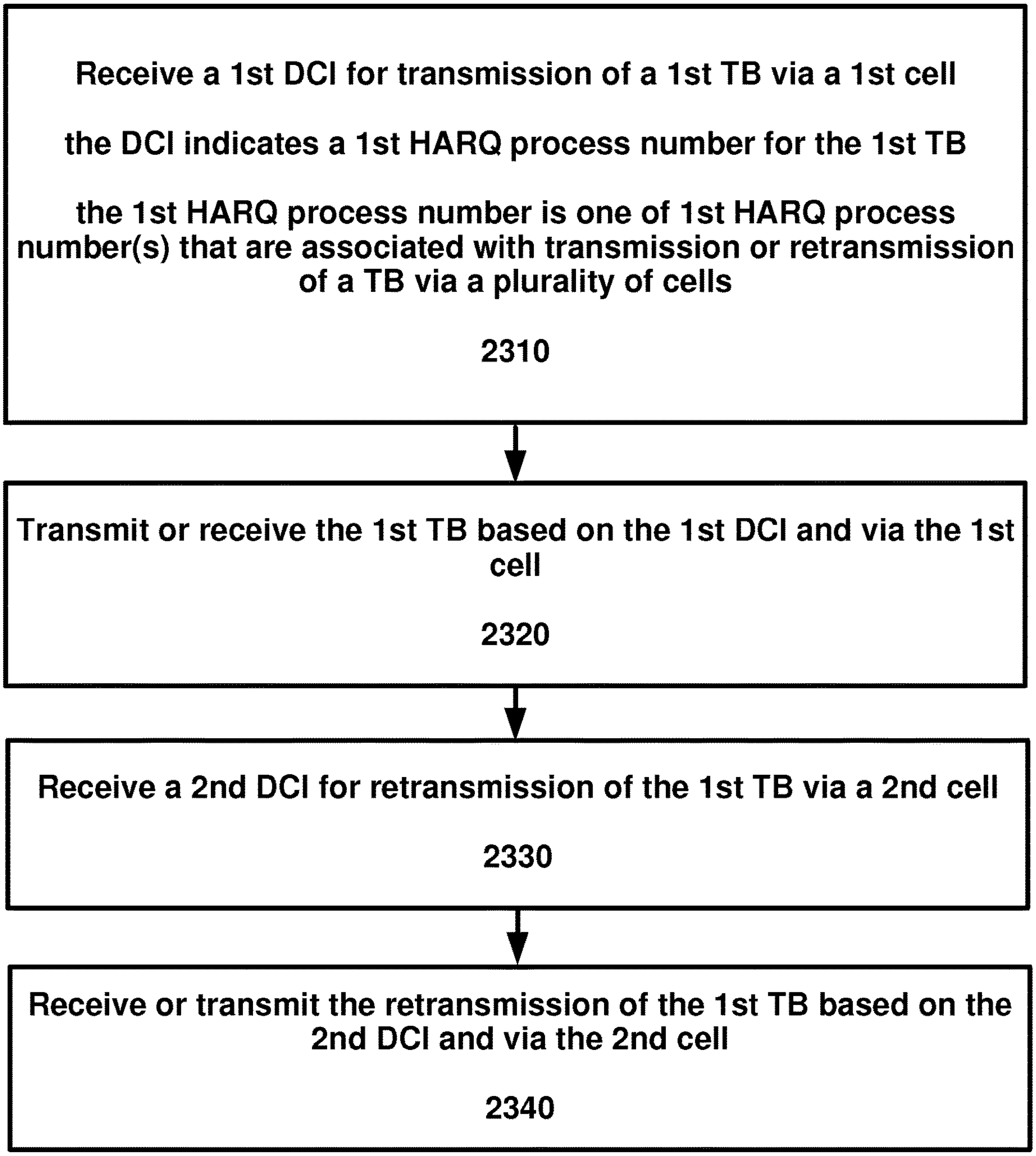
FIG. 23 shows an example flow diagram in accordance with several of various embodiments of the present disclosure.

FIG. 23 shows an example flow diagram in accordance with several of various embodiments of the present disclosure. At 2310, a wireless device may receive a first downlink control information (DCI) for transmission of a first transport block (TB) via a first cell. The DCI may indicate a first hybrid automatic repeat request (HARQ) process number for the first TB. The first HARQ process number may be one of one or more first HARQ process numbers that are associated with transmission or retransmission of a transport block via a plurality of cells. At 2320, the wireless device may transmit or may receive the first TB based on the first DCI and via the first cell. At 2330, the wireless device may receive a second DCI for retransmission of the first TB via a second cell. At 2340, the wireless device may receive or may transmit the retransmission of the first TB based on the second DCI and via the second cell.

In an example embodiment, the one or more first HARQ processes may be associated with transmission or retransmission of a transport block via a plurality of cells comprising the first cell and the second cell.

In an example embodiment, the first DCI, received at 2310, may comprise first scheduling information for the transmission of the first TB. In an example embodiment, the first scheduling information may comprise a first uplink grant or a first downlink assignment.

In an example embodiment, the second DCI, received at 2330, may comprise second scheduling information for the retransmission of the first TB. In an example embodiment, the second scheduling information may comprise a second uplink grant or a second downlink assignment.

In an example embodiment, the second DCI, received at 2330, may indicate the first HARQ process number.

In an example embodiment, the wireless device may receive one or more configuration parameters indicating the one or more first HARQ process numbers.

In an example embodiment, at least one of the first DCI, received at 2310, and the second DCI, received at 2330, may be associated with a first format that is used in scheduling transmission or retransmission of a TB via a plurality of cells.

In an example embodiment, at least one of the first DCI, received at 2310, and the second DCI, received at 2330, may be associated with a first radio network temporary identifier (RNTI) that is used in scheduling transmission or retransmission of a TB via a plurality of cells. In an example embodiment, a cyclic redundancy code associated with the at least one of the first DCI and the second DCI may be scrambled with the first RNTI.

In an example embodiment, at least one of the first DCI, received at 2310, and the second DCI, received at 2320, may comprise a field with a value indicating that the at least one of the first DCI and the second DCI is used in scheduling transmission or retransmission of a transport block via a plurality of cells.

Figure 24:
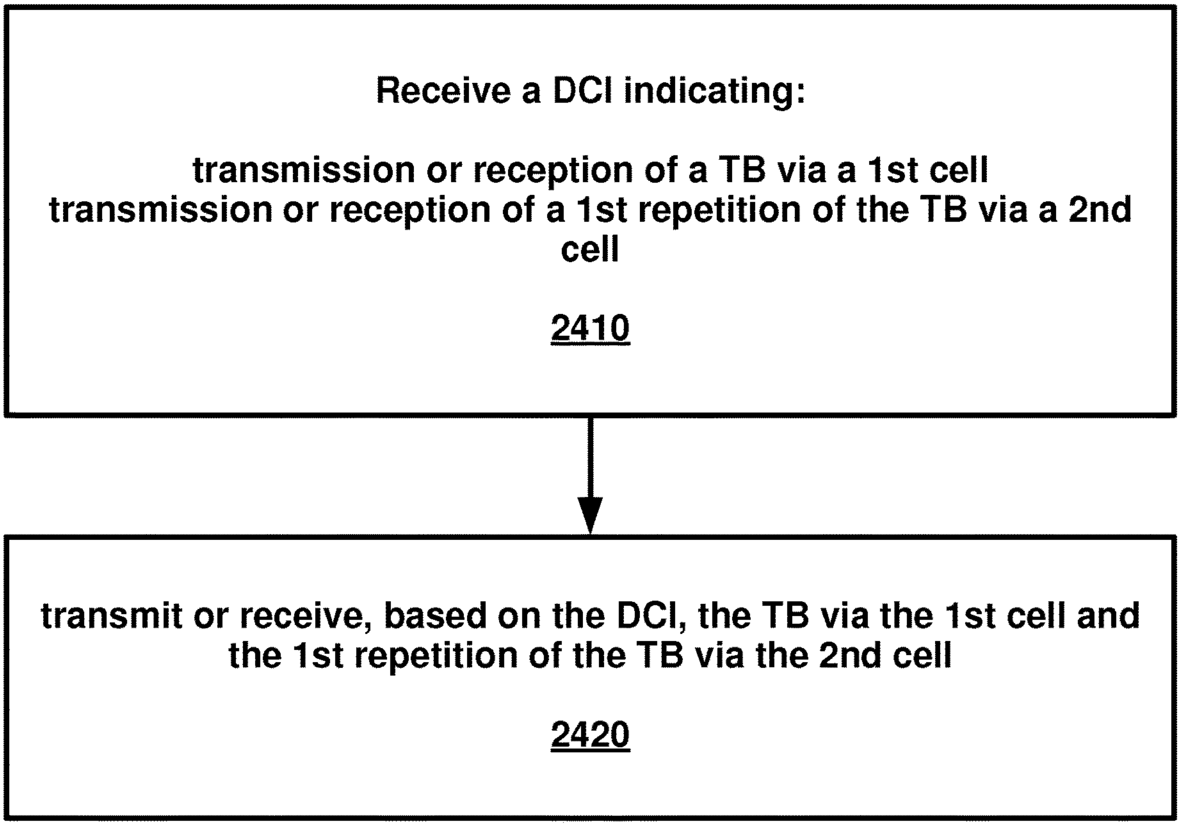
FIG. 24 shows an example flow diagram in accordance with several of various embodiments of the present disclosure.

FIG. 24 shows an example flow diagram in accordance with several of various embodiments of the present disclosure. At 2410, a wireless device may receive a downlink control information (DCI) indicating: transmission or reception of a transport block (TB) via a first cell; and transmission or reception of a first repetition of the TB via a second cell. At 2420, the wireless device may transmit or may receive, based on the DCI, the TB via the first cell and the first repetition of the TB via the second cell.

In an example embodiment, the DCI, received at 2410, may comprise scheduling information for: the transmission or the reception of the TB via the first cell; and the transmission or the reception of a first repetition of the TB via the second cell.

In an example embodiment, the DCI, received at 2410, may indicate transmission or reception of repetitions of the transport block via a plurality of cells comprising the second cell.

In an example embodiment, the DCI, received at 2410, may indicate the transmission or the reception of the transport block via the first cell in a first timing. The DCI may indicate the transmission or the reception of the first repetition of the transport block via the second cell in a second timing. In an example embodiment, the first timing and the second timing may overlap in at least one symbol. In an example embodiment, a difference between the first timing and the second timing may be less than a threshold. In an example embodiment, the wireless device may receive a configuration parameter indicating the threshold. In an example embodiment, the threshold may be in a first number of symbols. In an example embodiment, a duration of a symbol may be based on a first subcarrier spacing associated with the first cell or a first bandwidth part of the first cell.

In an example embodiment, the first cell or a first bandwidth part of the first cell may be associated with a first subcarrier spacing. The second cell or a second bandwidth part of the second cell may be associated with a second subcarrier spacing. In an example embodiment, the first subcarrier spacing may be the same as the second subcarrier spacing. In an example embodiment, the wireless device may receive a configuration parameter indicating an association between the first subcarrier spacing and the second subcarrier spacing.

In an example embodiment, the DCI, received at 2410, may indicate transmission of the transport block via the first cell associated with a first timing advance. The DCI, received at 2410, may indicate transmission of the first repetition of the transport block via the second cell associated with a second timing advance. In an example embodiment, the first timing advance and the second timing advance may be the same and/or the first cell and the second cell may be in the same timing advance group. In an example embodiment, a difference between the first timing advance and the second timing advance may be smaller than a threshold. In an example embodiment, the wireless device may receive a configuration parameter indicating the threshold.

In an example embodiment, the DCI, received at 2410, may indicate: transmission or reception of the transport block via the first cell at a first timing; and transmission or reception of a second repetition of the transport block via the first cell at a second timing.

In an example embodiment, the wireless device may receive one or more configuration parameters indicating a plurality of lists of cells comprising a first list of cells comprising the second cell. In an example embodiment, the first list is associated with a first index/identifier. The DCI, received at 2410, may indicate the first index/identifier. In an example embodiment, the DCI may comprise a field with a value indicating the index/identifier. In an example, the first list of cells may further comprise the first cell. In an example embodiment, the receiving the DCI, at 2410, may be via the first cell. In an example embodiment, the DCI, received at 2410, may comprise a field with a value indicating the first cell.

In an example embodiment, the DCI, received at 2410, may comprise one or more fields indicating a time allocation for: transmission or reception of the transport block via the first cell; and transmission or reception of the first repetition of the transport block via the second cell. In an example embodiment, the DCI, received at 2410, may indicate the same time allocation for transmission or reception of the transport block via the first cell and for transmission or reception of the first repetition of the transport block via the second cell.

In an example embodiment, the DCI, received at 2410, may comprise one or more fields indicating a frequency allocation for: transmission or reception of the transport block via the first cell; and transmission or reception of the first repetition of the transport block via the second cell. In an example embodiment, the DCI may indicate the same frequency allocation for transmission or reception of the transport block via the first cell and for transmission or reception of the first repetition of the transport block via the second cell.

In an example embodiment, the DCI, received at 2410, may comprise one or more fields indicating: a first frequency allocation for transmission or reception of the transport block via the first cell; and a second frequency allocation for transmission or reception of the transport block via the second cell.

In an example embodiment, the wireless device may determine a second frequency allocation, for transmission or reception of the first repetition of the transport block via the second cell, based on a first frequency allocation for transmission or reception of the transport block via the first cell, wherein the DCI, received at 2410, may comprise one or more fields indicating the first frequency allocation.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:

receiving, by a wireless device, a first downlink control information (DCI) indicating an initial transmission of a transport block via a first cell;

receiving a second DCI that is different from the first DCI and indicates:

retransmission of the first transport block via a second cell; and that the initial transmission of the first transport block was via the first cell; and transmitting or receiving the retransmission of the first transport block via the second cell based on the second DCI.

2. The method of claim 1, wherein:

the second DCI comprises scheduling information for retransmission of the first transport block; and the transmitting or the receiving the retransmission of the first transport bock is based on the scheduling information.

3. The method of claim 1, wherein at least one of a format associated with the second DCI, a radio network temporary identifier (RNTI) associated with the second DCI and a value of a field of the second DCI indicates that the initial transmission of the first transport block and the retransmission of the first transport block are via different cells.

4. The method of claim 1, wherein a value of a field of the second DCI indicates the first cell or indicates the second cell.

5. The method of claim 1, further comprising:

receiving a first configuration parameter indicating an association between the first cell and the second cell; and determining the second cell or the first cell based on the first configuration parameter.

6. The method of claim 1, wherein a second hybrid automatic repeat request (HARQ) process number associated with the retransmission of the first transport block, via the second cell, is based on the first HARQ process number associated with the initial transmission of the first transport block via the first cell.

7. The method of claim 6, wherein the second HARQ process number is the same as the first HARQ process number.

8. The method of claim 6, wherein the second HARQ process number is based on a configuration parameter.

9. The method of claim 1, wherein a redundancy version associated with the retransmission of the first transport block, via the second cell, is based on the first redundancy version associated with the initial transmission of the first transport block via the first cell.

10. The method of claim 9, wherein the second redundancy version is the same as the first redundancy version.

11. A wireless device comprising:

one or more processors; and memory storing instructions that, when executed by the one or more processors, cause the wireless device to:

receive a first downlink control information (DCI) indicating an initial transmission of a transport block via a first cell;

receive a second DCI that is different from the first DCI and indicates:

retransmission of the first transport block via a second cell; and that the initial transmission of the first transport block was via the first cell; and transmit or receive the retransmission of the first transport block via the second cell based on the second DCI.

12. The wireless device of claim 11, wherein:

the second DCI comprises scheduling information for retransmission of the first transport block; and transmitting or the receiving the retransmission of the first transport bock is based on the scheduling information.

13. The wireless device of claim 11, wherein at least one of a format associated with the second DCI, a radio network temporary identifier (RNTI) associated with the second DCI and a value of a field of the second DCI indicates that the initial transmission of the first transport block and the retransmission of the first transport block are via different cells.

14. The wireless device of claim 11, wherein a value of a field of the second DCI indicates the first cell or indicates the second cell.

15. The wireless device of claim 11, wherein the instructions, when executed by the one or more processors, further cause the wireless device to:

receive a first configuration parameter indicating an association between the first cell and the second cell; and determine the second cell or the first cell based on the first configuration parameter.

16. The wireless device of claim 11, wherein a second hybrid automatic repeat request (HARQ) process number associated with the retransmission of the first transport block, via the second cell, is based on the first HARQ process number associated with the initial transmission of the first transport block via the first cell.

17. The wireless device of claim 16, wherein the second HARQ process number is the same as the first HARQ process number.

18. The wireless device of claim 11, wherein a second redundancy version associated with the retransmission of the first transport block, via the second cell, is based on a first redundancy version associated with the initial transmission of the first transport block via the first cell.

19. The wireless device of claim 18, wherein the second redundancy version is the same as the first redundancy version.

20. A system comprising:

a base station; and a wireless device comprising: one or more processors; and memory storing instructions that, when executed by the one or more processors, cause the wireless device to: receive, from the base station, a first downlink control information (DCI) indicating an initial transmission of a transport block via a first cell; receive a second DCI that is different from the first DCI and indicates: retransmission of the first transport block via a second cell; and that the initial transmission of the first transport block was via the first cell; and transmit or receive the retransmission of the first transport block via the second cell based on the second DCI.

* * * * *